US007853508B2

(12) United States Patent
Scumniotales et al.

(10) Patent No.: US 7,853,508 B2
(45) Date of Patent: Dec. 14, 2010

(54) METHOD AND SYSTEM FOR OBJECT-ORIENTED MANAGEMENT OF MULTI-DIMENSIONAL DATA

(75) Inventors: John Scumniotales, Redmond, WA (US); Eric Burke, Seattle, WA (US); Robert Cahn, Federal Way, WA (US); Thomas Fannon, Redmond, WA (US); Mitchel Burns, Woodinville, WA (US); Michael Lester, Monroe, WA (US); Jeff Hill, Snohomish, WA (US)

(73) Assignee: Serena Software, Inc., Redwood City, CA (US)

( * ) Notice: Subject to any disclaimer, the term of this patent is extended or adjusted under 35 U.S.C. 154(b) by 1619 days.

(21) Appl. No.: 10/613,534

(22) Filed: Jul. 3, 2003

(65) Prior Publication Data

US 2004/0236655 A1    Nov. 25, 2004

Related U.S. Application Data

(60) Provisional application No. 60/471,811, filed on May 19, 2003.

(51) Int. Cl.
*G06Q 40/00* (2006.01)
(52) U.S. Cl. .............................. 705/36 R; 705/7; 705/35
(58) Field of Classification Search ............... 705/36 R, 705/7
See application file for complete search history.

(56) References Cited

U.S. PATENT DOCUMENTS

| | | | | |
|---|---|---|---|---|
| 5,359,724 | A | 10/1994 | Earle | 395/425 |
| 5,519,875 | A | 5/1996 | Yokoyama et al. | 395/800 |
| 6,105,074 | A | 8/2000 | Yokote | 709/328 |
| 6,253,191 | B1 * | 6/2001 | Hoffman | 705/35 |
| 6,694,511 | B1 | 2/2004 | Yokote | 717/148 |
| 6,801,199 | B1 | 10/2004 | Wallman | |
| 6,954,761 | B2 * | 10/2005 | Azuma | 1/1 |
| 7,110,971 | B2 | 9/2006 | Wallman | |
| 7,117,176 | B2 | 10/2006 | Wallman | |
| 2003/0110113 | A1 | 6/2003 | Martin | |

OTHER PUBLICATIONS

"About OLAP," URL=http://www.olapcouncil.org/about/aboutco.htm, 1997, download date May 2, 2003, 1 page.

(Continued)

*Primary Examiner*—James A Kramer
*Assistant Examiner*—James A Vezeris
(74) *Attorney, Agent, or Firm*—Black Lowe & Graham PLLC

(57) ABSTRACT

Methods and systems for managing and analyzing multi-dimensional data are provided. Example embodiments provide a Meta-Object Data Management System "MODMS," which enables users to arrange and to rearrange hierarchical relationships of the data on an ad-hoc basis and allows the data to be analyzed using any set of attributes (dimensions) while the system is running. The MODMS represents heterogeneous data in a normalized (standardized) fashion using an object type management system that allows the arbitrary coercion of one type of object into another different type of object and automatically resolves attribute dependencies. In one embodiment, the MODMS comprises an object type management subsystem; a meta-object instantiation subsystem; one or more data repositories; and an input/output interface. These components cooperate to allow the creation, management, and analysis of relationships between many different types of single and multi-dimensional data. The MODMS may be used to implement an enterprise portfolio management system.

75 Claims, 28 Drawing Sheets

OTHER PUBLICATIONS

Codd et al., "Providing OLAP to User-Analysts: An IT Mandate," White Paper from E. F. Codd Associates, 1993.

Colliat, "OLAP, Relational, and Multidimensional Database Systems," *SIGMOD Record* 25(3):64-69, Sep. 1996.

"Executive Guide to Managing Information Technology Portfolios," URL=http://www.wa.gov/dis/portfolio, Apr. 2002, 17 pages.

Gates, "Project management tools: A new look," *Application Development Trends*, Mar. 2003, URL=http://www.adtmag.com/print.asp?id=7349, download date Apr. 30, 2003, 4 pages.

"Hyperion® Essbase® Data Mart Design Approaches," White Paper from Hyperion Solutions Corporation, Nov. 2000.

"ITaP: Portfolio Management Tool Requirements Definition and Tool Recommendation," URL=http://www.itap.purdue.edu/projects/detail.cfm?ProjectID=268, download date May 6, 2003, 2 pages.

Kuo, "Management Dashboards: Enabling Performance Management across the Enterprise," White Paper from BusinessObjects.

"Large-Scale Data Warehousing Using Hyperio Essbase OLAP Technology," White Paper from Hyperion Solutions Corporation, Jan. 2000.

Morris et al., "Hyperion Solutions: Meeting the Need for Packaged and Custom Analytic Applications," IDC White Paper, Jun. 2001.

Nuage, "BusinessObjects Application Foundation: The Framework for Delivering Analytic Applications," Data Sheet from Business Objects™, Jul. 2002.

"OLAP and OLAP Server Definitions: OLAP: On-Line Analytical Processing," URL=http://www.olapcouncil.org/research/glossaryly.htm, 1997, download date May 2, 2003, 9 pages.

"OLAP Council White Paper," URL=http://www.olapcouncil.org/research/whtpapco.htm, 1997, download date May 2, 2003, 4 pages.

"Product Development Consulting, Inc.: Portfolio Management," URL=http://www.pdcinc.com/practice/portfolio.html, download date May 6, 2003, 3 pages.

Rottach, "WebIntelligence: Integrated Query, Reporting, and Analysis for the Web," Data Sheet from BusinessObjects™, Jun. 2002.

Shaw, "Business Performance Management: Gaining Insight and Driving Performance," White Paper from Hyperion Solutions Corporation, 2003.

"The Business Intelligence Industry's Leading Products and Services," White Paper from BusinessObjects, 2001.

"The Role of the OLAP Server in a Data Warehousing Solution," White Paper from Hyperion Solutions Corporation, 2001.

Van den Bergh, "BusinessObjects™: Integrated Query, Reporting, and Analysis for the Enterprise," Data Sheet from Business Objects™, Apr. 2001.

\* cited by examiner

METHOD AND SYSTEM FOR OBJECT-ORIENTED MANAGEMENT OF MULTI-DIMENSIONAL DATA

BACKGROUND OF THE INVENTION

1. Field of the Invention

The present invention relates to methods and systems for managing multi-dimensional data and, in particular, to methods and systems for creating, maintaining, and analyzing portfolios of multi-dimensional data, such as project, asset, and product investments, using an object-oriented paradigm.

2. Background Information

Today's companies, institutions, and other organizations are plagued by the vast amount of data which is now stored electronically and often needs to be analyzed by a variety of persons within the organization relative to business or organizational goals. The need to determine efficiently what data is available for analysis and how to analyze disparate data across organizational management boundaries is an ever-increasing problem as the data being tracked increases and as organizations implement more specialized or distributed functions. Managers, executives, employees, and other personnel, each with possibly differing needs for particular content and detail, need to analyze how different changes might effect the projects, products, resources, finances, and assets that each are responsible for. Rapid planning cycles, optimizing the use of critical resources, eliminating low value, non-strategic, redundant, and poorly performing assets and projects, and real time visibility of results are common goals in today's organizations.

The idea of "portfolio management" has evolved within such organizations as a way to emphasize that all assets of an organization, be they financial, human, equipment resources, human resources or other assets, require management and oversight in the same manner as traditional investments such as real property, commercial paper, and equity investments. Managing a group of assets as a portfolio encourages decision makers to view the member investments as a whole but also be able to analyze and scrutinize each discrete investment. Portfolio-based management of IT assets, such as technology investments, has become a popular example of applying portfolio management in a modern day organization. With portfolio-based management, IT information such as inventory lists, spreadsheets, and project management data are managed as assets that need to be analyzed as to how well they are meeting IT and organizational level objectives.

Traditionally, discrete systems have been developed to handle the data management and analysis needs of various entities within an organization. This phenomenon has grown out of the situation that the data for each entity is typically stored in its own subsystem and analysis tools have been developed that are targeted for the specific needs of that entity. Thus, to date, portfolio management systems have been created to separately manage each type of investment. For example, extensive financial management and analysis systems have been developed and used to analyze the financial assets of an organization such as stocks, bonds, and other commercial paper. Classically, the data for these systems is stored in a variety of (typically) relational data base management systems (RDBMS) so that queries can be executed to gain historical insight into the data. "What-if" scenarios are often handled by separate analysis packages that are specific to the type of data being analyzed and the type of analysis conducted. On-line analysis processing packages (OLAP packages) have been developed to support such "what-if" analysis with data that have a large number of axes/variables (often referred to as multi-dimensioned data). For example, an inventory control system of a geographical distributed company may have resource data that can be viewed, analyzed, and sorted by geographic location, region, type of resource, date placed in operation, organization, responsible party, etc. An OLAP package attempts to collect and store such data according to how the data is expected be analyzed so as to optimize analysis efficiency (by reducing search times). In order to analyze the same data according to different views, the system is taken off-line and the data structures are recalculated to prepare for additional analysis. This can be a very time consuming and burdensome process if the data set is very large, as is typical.

Similarly, to handle project management, separate project management and analysis systems have been developed to aid managers and other executives in the project planning and execution lifecycles of projects within an organization. For example, there are systems that offer extensive milestone, critical path, and resource analysis for organization data that can be defined as a project. There exist tools today that allow a group of projects to be viewed as "investments" within a portfolio. These tools provide a way for project managers and other executives within an organization to analyze the costs and benefits of such projects in a similar manner to how financial analysts analyze financial investments.

BRIEF SUMMARY OF THE INVENTION

Embodiments of the present invention provide enhanced computer- and network-based methods and systems for managing and analyzing multi-dimensional data. Multi-dimensional data is data having a large plurality of attributes, such as data found in enterprise management systems. Example embodiments provide a Meta-Object Data Management System ("MODMS"), which enables users to arrange and to rearrange the hierarchical relationships of the data on an ad-hoc basis so that the data may be analyzed using any set of attributes (dimensions) while the system is running. The MODMS stores heterogeneous data in a normalized (standardized) fashion using an object type management system, which allows the arbitrary coercion of one type of object into another different type of object and automatically resolves attribute dependencies. The arbitrary coercion of one type of object into another different type of object permits and supports a system whereby any type of investment can be contained within any other type of investment, so investments can be moved within and across portfolios at will.

The Meta-Object Data Management System provides techniques for creating, managing, and analyzing relationships between, typically, heterogeneous, multi-dimensional data. In one example embodiment, the Meta-Object Data Management System comprises one or more functional components/modules that work together to implement an enterprise portfolio management system.

According to one approach, a Meta-Object Data Management System comprises an object type management subsystem, a meta-object instantiation subsystem, one or more data repositories that hold the data used to populate objects and object type definitions (for whatever other data is being managed), and an input/output interface. For example, the data repositories may store the financial investment data and the project management (investment) data of the enterprise. The object type management subsystem is used to define objects that correspond to the various data types (e.g., investment types) that will be created and managed by the MODMS. The meta-object instantiation subsystem is used to create instances of object types defined by the object type management system. The input/output interface represents any interface to the components of the MODMS and make take the form of a user command interface or a programmatic interface, such as an application programming interface definition.

In one aspect, each meta-object comprises an object identifier, an object type, and an attribute block. In another aspect, each object type is a collection of attributes defined from a global attributes data structure. An object type definition can be dynamically and automatically changed, by modifying one of the global attributes associated with that object type. When an object type definition is changed, the MODMS automatically adjusts each instantiated meta-object that is associated with that object type without recompiling or recreating the meta-objects. In yet another aspect, meta-objects do not obey traditional inheritance rules, and thus each meta-object can be type cast into a different object type. In another aspect, an attribute block stores all of the attribute values for a single meta-object. Each attribute value is stored between a beginning attribute tag and an ending attribute tag that identifies the attribute. The attribute tag-value pairs are stored in a serialized single variable within the meta-object. In one of these aspects, the tags are XML tags.

In another aspect, multi-dimensional views of the data can be dynamically created through the use of datasheets. A datasheet attribute specification is defined, and a corresponding datasheet is computed based upon the object instance associated with the datasheet. When datasheets are moved and copied to different locations, their resultant data and presentation is automatically adjusted for the new location. In one of these aspects, a datasheet is represented using a virtual object tree. A virtual object is generated for each grouping of data that matches a discrete combination of values of the attributes identified by the datasheet attribute specification. Then, a virtual object is generated for each specified group of groups, until all groupings and sub-groupings have been associated with virtual objects.

In yet another aspect, charts that represent multi-dimensional views of the data can also be dynamically created. Each chart is associated with a datasheet and the structure of the chart can automatically reflect the dimensions of the datasheet, or be manually controlled. Once a chart structure has been created, the presentation displayed by the chart structure can be automatically modified by selecting a different axis of the data to be presented. The resulting chart is then automatically populated using values of the underlying datasheet.

According to another approach, a portfolio management system is created using the MODMS. The portfolio management system comprises a portfolio manager for instantiating meta-objects to correspond to portfolio data and a portfolio analyzer for displaying instantiated meta-objects whose attribute values match an attribute specification.

In an example portfolio management system, heterogeneous investment data, for example financial investments and project management resource investments are managed and analyzed using a single abstraction, a meta-object. In addition, each investment data item can be converted to a different type of investment data item without reentering the original data. Investment data can be dynamically organized within other investment data irrespective of the type of investment data.

All of these approaches and aspects and other approaches and aspects are supported by the methods and systems of a Meta-Object Data Management System.

DETAILED DESCRIPTION OF THE INVENTION

Embodiments of the present invention provide enhanced computer- and network-based methods and systems for managing and analyzing multi-dimensional data. Multi-dimensional data is data having a large plurality of attributes, such as data found in enterprise management systems. Example embodiments provide a Meta-Object Data Management System ("MODMS"), which enables users to arrange and to rearrange the hierarchical relationships of the data on an ad-hoc basis and allows the data to be analyzed using any set of attributes (dimensions) while the system is running. Thus, analysis of the data can appear to occur concurrently with transactions on the underlying data. The MODMS represents heterogeneous data in a normalized (standardized) fashion using an object type management system that allows the arbitrary coercion of one type of object into another different type of object and automatically resolves attribute dependencies. Attribute dependencies occur when the values of attributes of one object are calculated or dependent upon attribute values of another object. Such dependencies are useful in portfolio management applications where, for example, values that correspond to a cost attribute of multiple investment line items are aggregated (rolled-up) into a summary line item that represents the cost attribute of the portfolio as a whole. The arbitrary coercion of one type of object into another different type of object permits and supports a system whereby any type of object can be contained within any other type of object, so, for example, investments in a portfolio management system can be moved within and across portfolios at will.

The Meta-Object Data Management System provides techniques for creating, managing, and analyzing relationships between, typically heterogeneous, multi-dimensional data. In one example embodiment, the Meta-Object Data Management System comprises one or more functional components/modules that work together to implement an enterprise portfolio management system. One skilled in the art will recognize, however, that the techniques of a MODMS may be used for the creation, management, and analysis of relationships between many different types of single and multi-dimensional data, and is not limited to use with portfolio management.

Figure 1:
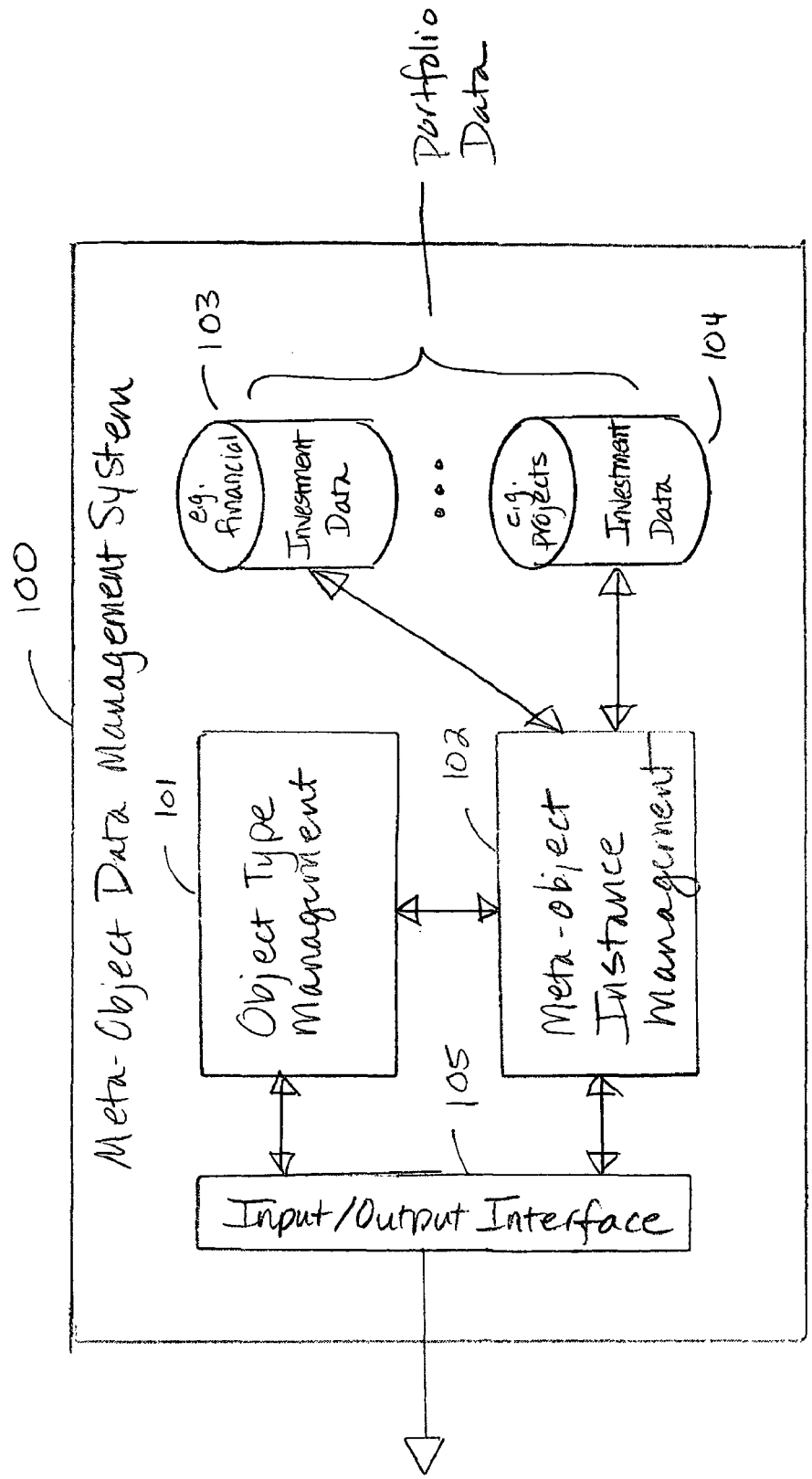
FIG. 1 is an example block diagram of components of an example Meta-Object Data Management System.

FIG. 1 is an example block diagram of components of an example Meta-Object Data Management System. One skilled in the art will recognize that these components may be implemented in software or hardware or a combination of both. As shown, a Meta-Object Data Management System may comprise an object type management subsystem 101; a meta-object instantiation subsystem 102; one or more data repositories 103-104 that hold, for example, the data used to populate objects and object type definitions (for whatever data is being managed); and an input/output interface 105. For example, the data repository 103 may store the financial investment data of an enterprise and the data repository 104 may store the project management (investment) data of the enterprise. The object type management subsystem 101 is used to define object types that correspond to the various data types (e.g., investment types) that will be created and managed by the MODMS. The meta-object instantiation subsystem 102 is used to create instances of the object types defined by the object type management system 101. The input/output interface 105 represents any interface to the components of the MODMS and make take the form of a user command interface or a programmatic interface, such as an application programming interface definition.

More specifically, the object type management subsystem 101 defines and manages global attributes and creates and manage object type definitions, which are each a collection of one or more global attributes. An excerpt from an example set of global attribute definitions for an example enterprise portfolio management system is attached as Appendix B, which is herein incorporated by reference in its entirety. Example global attributes may include characteristics of the data to be stored and analyzed such as a description, cost to date, tangible benefits, intangible benefits, etc., or any other definable characteristic whose value can be specified. Global attributes can be added, deleted, and modified while the MODMS is running. Once an object type definition is created, its collection of attributes can be adjusted. For example, attributes can be added to or deleted from an object type definition. Further, when an attribute definition is adjusted, any changes are percolated throughout the object type definitions that include that attribute.

The meta-object instantiation subsystem 102 supports the creation of instances of objects that are defined by the object type management system 101. The meta-object instantiation subsystem 102 implements an abstraction of a "higher level" object, known as a meta-object, that is not tied to a particular object type, but rather implements a broader object concept that is used to unify the creation and management of all object types that correspond to user data. For example, within a portfolio management system, a meta-object is instantiated (created) to correspond to each "investment" type in the system, including, for example, portfolios, projects, products, financial assets, equipment, initiatives, operations, applications, processes, activities, human resources, other resources, other assets, etc. A representation of a hierarchy of investments is created based upon the relationships desired between investments by instantiating a meta-object that corresponds to one investment as a child of another meta-object that corresponds to another investment. The object type definitions themselves do not define the containment or inheritance relationships as common in other object-oriented systems. Rather, the containment hierarchy of instantiated meta-objects defines the relationships between the investments. Once meta-objects are instantiated, they can be moved, copied, deleted, and their attributes changed. When a meta-object is moved or copied, the attribute values of the original parent meta-object instance and the new parent meta-object instance that are dependent upon children meta-object instances are automatically adjusted (rolled up) to reflect the new containment structure. Thus, for example, when an instantiated investment object is moved to a new portfolio, the attributes of the original parent portfolio and the new parent portfolio are automatically recomputed. Similarly, when an object type definition is changed, instantiated meta-objects of the modified object type are automatically adjusted to reflect changes to the object type definition. Thus, for example, if the definition of a human resource object type is changed to add an "age" characteristic, then instances of human resource objects already created by the meta-object instantiation system 102 are automatically updated to include an "age" attribute with a default value.

In addition to defining representations for types of objects and for managing the data associated with them, the MODMS supports the concurrent analysis of data (e.g., investment data) through the use of datasheets. A datasheet is a multi-dimensional view of the underlying instance hierarchy based upon a datasheet attribute specification (e.g., a property sheet). For example, a new multi-dimensional view of the portfolio investment hierarchy can be formed dynamically by instantiating a new datasheet based upon specified properties. In one embodiment, the datasheet properties (the attribute specification) specify axes (data columns of interest), grouping, sorting, and filtering. A corresponding datasheet is then determined (calculated) by the system and displayed. Once a datasheet is generated, its properties can be adjusted, thereby causing an automatic adjustment and recalculation of the resultant datasheet. In one example embodiment, a datasheet is associated with a particular meta-object in the instance hierarchy and relates to the objects within that sub-tree of the containment hierarchy. A datasheet (or more precisely, its attribute specification) can be deleted, moved, or copied, thereby automatically causing adjustments to be made to the resultant datasheet dependant upon revised location and adjustments to be made to the associated meta-object if applicable.

Although the techniques of a Meta-Object Data Management System are generally applicable to any type of investment, the terms "investment" and "asset" are used generally to imply any type of data having one or more attributes whose cost or benefit can be assessed. One skilled in the art will recognize that an investment is not limited to traditional investment types such as real property, commercial paper, and equity investments. Rather, a MODMS can be used to support the creation, management, and analysis of any type of data object, whether commonly considered an "investment" or not.

Also, although the examples described herein often refer to portfolio management and enterprise portfolio management, one skilled in the art will recognize that the subsystems (components) of a MODMS are defined generically and that the techniques of the present invention can also be used in any system that desires to create and manage different types of data objects whose relationships to each other may change over time. In addition, the concepts and techniques described are applicable to other data management systems, including other types of applications that use data repositories to store related information, for example, inventory control systems, product databases, manufacturing systems, corporate finances, etc. Essentially, the concepts and techniques described are applicable to any data management environment. In the following description, numerous specific details are set forth, such as data formats and code sequences, etc., in order to provide a thorough understanding of the techniques of the methods and systems of the present invention. One skilled in the art will recognize, however, that the present invention also can be practiced without some of the specific details described herein, or with other specific details, such as changes with respect to the ordering of the code flow.

In addition, although certain terms are used primarily herein, one skilled in the art will recognize that other terms could be used interchangeably to yield equivalent embodiments and examples. For example, it is well known that equivalent terms could be substituted for such terms as "object," "attribute," "dimension," etc. In addition, terms may have alternate spellings which may or may not be explicitly mentioned, and one skilled in the art will recognize that all such variations of terms are intended to be included.

Figure 2:
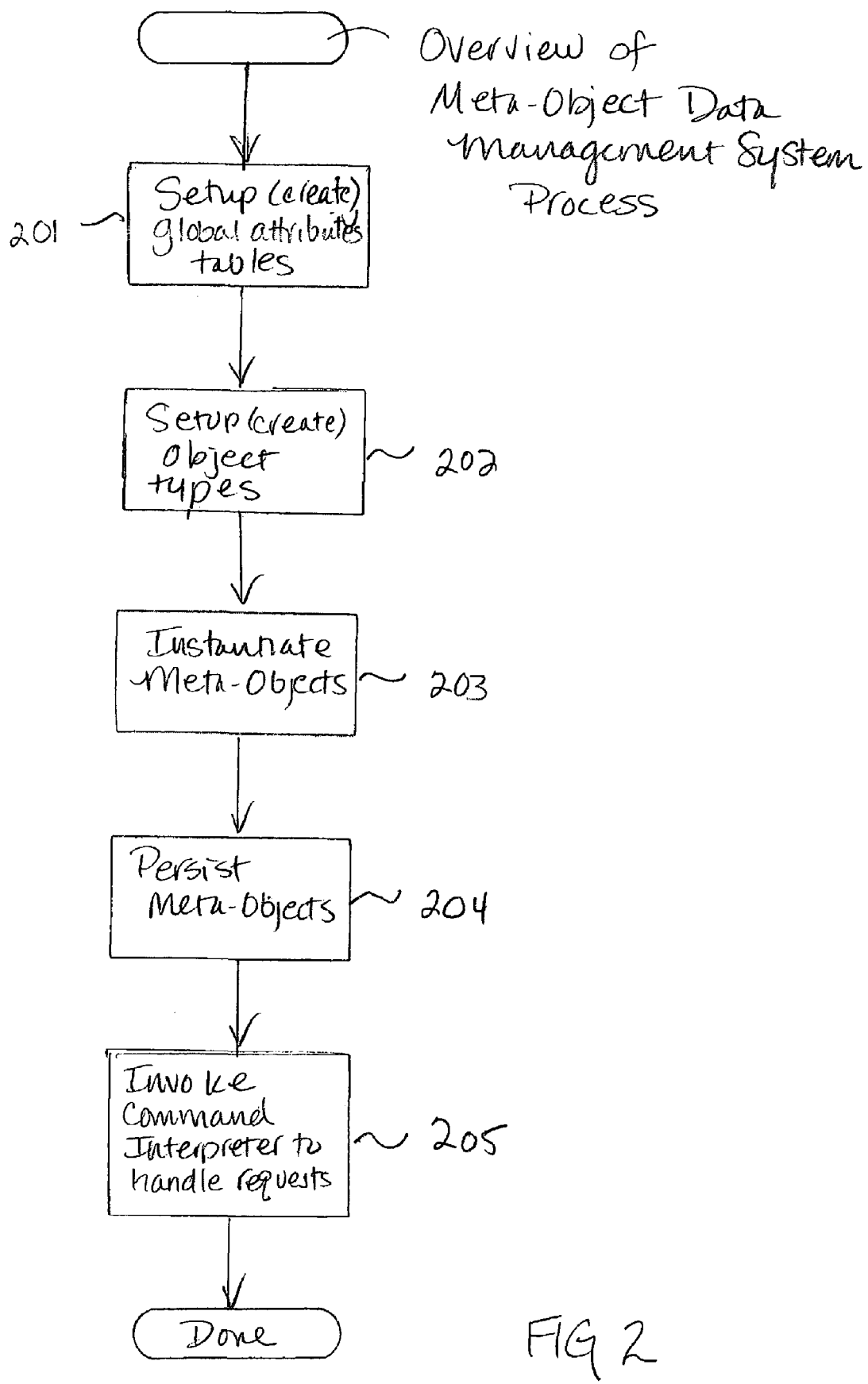
FIG. 2 is an example overview flow diagram of typical operations of an example Meta-Object Data Management System.

FIG. 2 is an example overview flow diagram of typical operations of an example Meta-Object Data Management System. In step 201, the MODMS supports the setup (creation) or management of a global attribute tables. The global attribute tables are used in step 202 to define (create) object types. One skilled in the art will recognize that any well-known technique can be used to implement a global attributes table, and that any data structure equivalent of a "table" may be employed. Each object type definition is based upon a collection of global attribute definitions and a set of methods (functions) shared by all meta-objects. Typically, as shown in the example global attributes table excerpt of Appendix B, each global attribute is associated with one or more attribute values and the table contains one or more "attribute value definitions" (fields) that describe how each attribute value to be used or interpreted. Each attribute may define more than one set of values. For example, an attribute may define one set of values that correspond to target values and define a different set of values (and potentially calculations) that correspond to actual values. An attribute that defines multiple sets of values is referred to as a "dimensioned" attribute. One skilled in the art will recognize that a dimensioned attribute is an attribute that defines multiple value sets and that each dimension instead could be represented as its own attribute. In the example global attribute table excerpted in Appendix B, each attribute definition contains a tag name for identification, a descriptive name, an indication of whether multiple attribute values (dimensions) are associated with the attribute and, for each dimension of the attribute or for a single valued attribute, an attribute value definition, which is a set of fields as that further define that value. For example, each attribute value definition typically defines:

if dimensioned, a type of dimension (e.g., target, plan, baseline, scenario, actual);

an indication of whether the attribute value can be rolled up to a corresponding parent attribute value and, if so, the type of roll-up function associated with that value;

an indication of whether the attribute value is calculated, and, if so, the calculation function for that attribute value;

an indication of whether the attribute value is a time-phased attribute and, if so, then the type of time-phased attribute is indicated.

Figure 5:
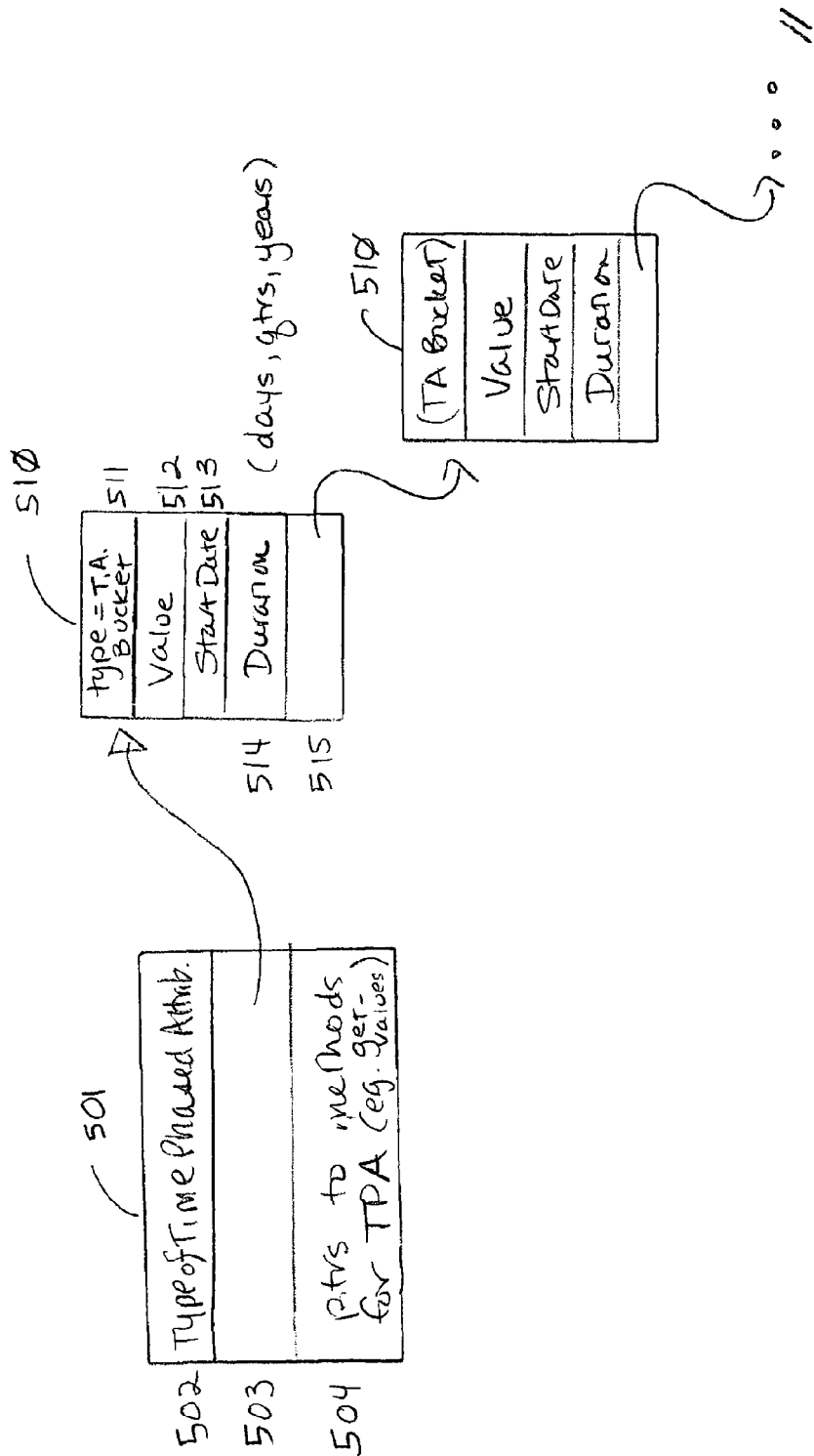
FIG. 5 is an example block diagram of an in-memory data structure representation of time-phased attribute.

Generally, time-phased attributes are attributes that have discrete values or ranges of values over periods of time, and described in more detail with reference to FIG. 5. Other fields and types of values (not shown) may also be defined in an attribute value definition and in an attribute definition. In step 203, meta-objects are instantiated using the created object types to correspond to the data that is to be managed and analyzed. In step 204, these meta-objects are persisted into storage. Then in step 205, a command interpreter is invoked to handle requests to manipulate the instantiated meta-objects and to manage the object type management subsystem.

Figure 3:
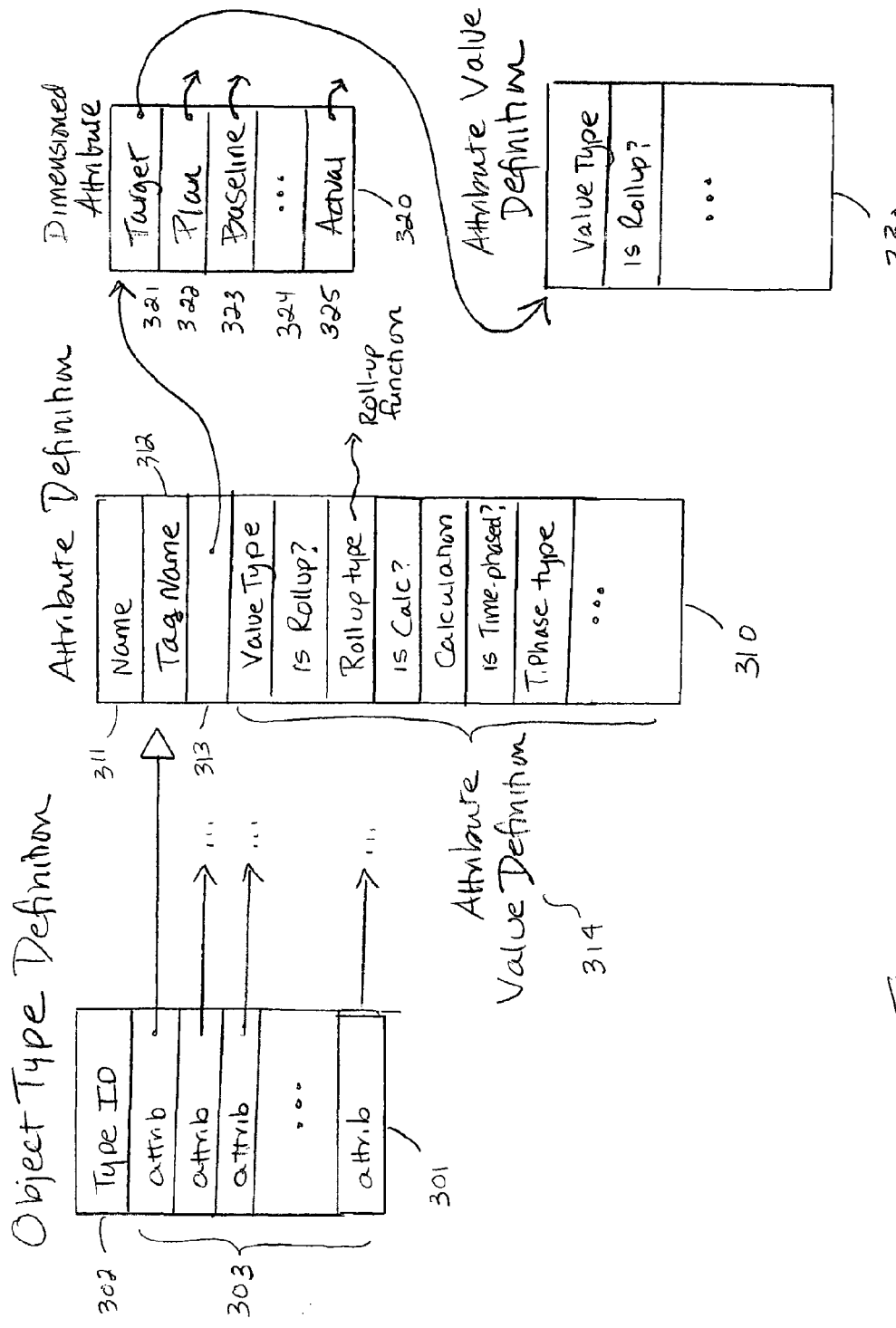
FIG. 3 is an example block diagram abstraction of an object type definition created and managed by an example object type management component of a Meta-Object Data Management System.

An administrator of an application that incorporates the MODMS typically uses an interface to the object type management system to define object types for the data to be manipulated by the application. The administrator creates a new object type (using well-known types of interfaces such as dialog boxes, tables, forms, Q&A etc.) by determining which of the global attributes are grouped together to form the new object type. FIG. 3 is an example block diagram abstraction of an object type definition created and managed by an example object type management component of a Meta-Object Data Management System. Each object type definition 301 created by the object type management component of a MODMS comprises at least an object type identifier 302 and a collection of one or more attributes 303. Each attribute of the collection 303 is an indicator to an attribute definition 310 stored in the MODMS, for example as one or more rows of a table similar to the table described in Appendix B. The data structures shown in FIG. 3 are abstract representations of the data, and one skilled in the art will recognize that any well-known method for storing tabular or linked information may be used. An attribute definition 310 defines all of the fields that comprise the attribute. As described with reference to FIG. 2, each attribute definition 310 typically comprises a descriptive name field 311, an identification tag name field 312, and an indicator to one or more attribute value definitions, for example, attribute value definition 314. When the attribute definition 310 defines a dimensioned attribute, then an indicator 313 is present that refers to multiple attribute value definitions 330 through a dimensioned attribute table 320. Specifically, for each value set that comprises a dimension of the attribute, there is an indicator, such as indicators 321-325 in the dimensioned attribute table 320 that refers to an attribute value definition 330. The different value sets for a dimensioned attribute may correspond, for example, to target values 321, plan values 322, baseline values 323, actual values 325, and other such value sets 324. These different dimensions of an attribute are present to convey the concept that a single attribute may have different values depending upon its purpose, lifecycle state, or for other reasons. Each attribute value definition 314 or 330 comprises, for example, a type of value; an indication of whether the attribute value roles up to a parent node and, if so, a rollup function; an indication of whether the value is a calculated value and, if so, a calculation function; and an indication of whether the attribute is a time-phased attribute and, if so, the type of time phased attribute, etc. One skilled in the art will recognize that even if the attribute is not a dimensioned attribute, the attribute value definition 314 may be stored in the table 320 using the same mechanism as for a dimensioned attribute instead of being stored directly in the attribute definition 310 as shown in FIG. 3. (Although attribute value definition 314 can be represented by the same structure as 330, storing the attribute value definition outside of the dimensioned attribute table may yield processing efficiencies.)

Figure 4:
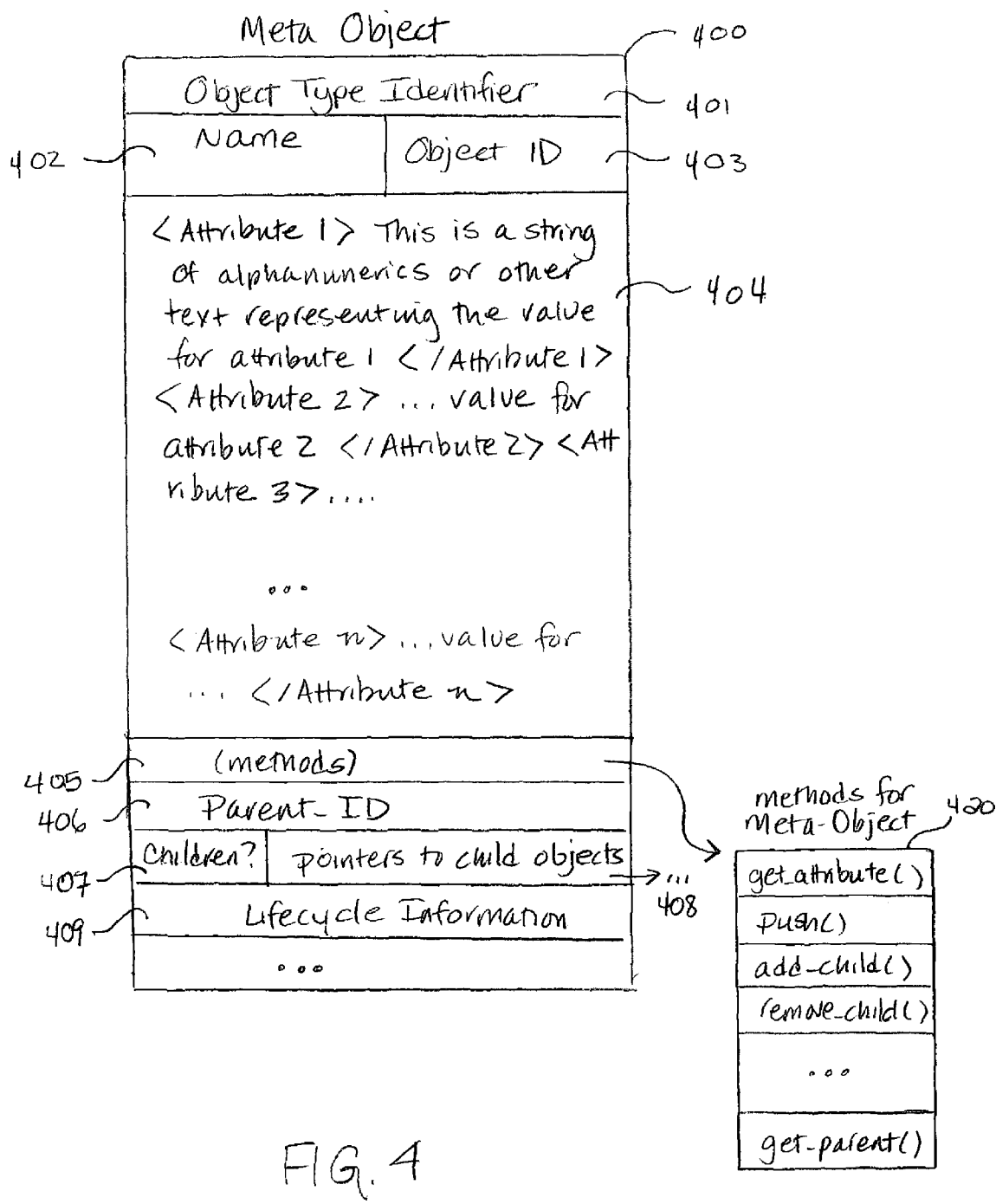
FIG. 4 is an example block diagram of an example meta-object.

Once the object type definitions have been created using the object type management component of the MODMS, then a user of the application that incorporates the MODMS can instantiate meta-objects using a meta-object instantiation component of the MODMS. FIG. 4 is an example block diagram of an example meta-object. Meta-object 400 includes an identifier of the type of object that is instantiated 401, a name 402, an identifier of the instantiated object 403, and an attribute block 404, which stores the collection of attribute values for all of the attributes defined for the object type denoted by object type identifier 401. The attribute value definitions of each attribute (such as those described with reference to FIG. 3) are used to determine how each attribute value in attribute block 404 is to be interpreted and treated. In one embodiment, the attribute block is implemented as a "tagged" data structure of, typically, alphanumeric text that represents the value for each attribute between a set of tags, such as XML tags. So, as shown in FIG. 4, the first attribute value is delimited with the beginning tag "<Attribute 1>" and with the ending tag "</Attribute 1>." The tag used in the attribute block 404 corresponds to the tag defined as tag name 312 in FIG. 3. Each meta-object 400 typically includes other fields, such as: an indicator 405 to a table of methods 420 that define the behavior of each meta-object 400; an indication of a parent meta-object 406 in an instance hierarchy; a flag 407 that indicates whether the object has any associated children meta-objects; indicators 408 to the children meta-objects of meta-object 400 in the instance hierarchy; lifecycle information 409; and other fields (not shown) 410.

One perspective of the attribute block 404 is that of a serialized "cache" of attribute values within an instantiated object. Because the attribute block 404 contains serialized data and stores each attribute value in a normalized (standard) fashion, the values of the attributes can be easily persisted, for example, using well-known database management technology. In addition, the tag methodology of the block 404 allows the attribute cache to be searched efficiently. Because a meta-object is an abstraction provided by the MODMS, one skilled in the art will recognize that the abstraction can be physically implemented according to a variety of techniques. For example, when an already instantiated meta-object is read and assembled from persistent storage to be manipulated by the MODMS, the various implementations of an MODMS may temporarily store the attribute values of attribute block 404 information as discrete data structures using traditional object-oriented techniques that instantiate objects for each value based upon the attribute type, etc. Other techniques, such as more traditional monolithic programming techniques may also be employed to implement a meta-object abstraction. From the perspective of a user of an application built upon MODMS, however, each meta-object looks and acts the same regardless of the type of object that is instantiated.

If one of the attribute values of the attribute block 404 is a time-phased value, then the value is more specifically described as a series of time-phased values, where each time-phased value is in effect over a range of time. For example, a time-phased attribute may have a discrete value for each week over a three-year period. FIG. 5 is an example block diagram of an in-memory data structure representation of time-phased attribute. Each time-phased attribute 501 has an associated time-phased attribute type 502; an indicator 503 to a collection of one or more time-phased buckets 510; and pointers to the methods 504 that can be used to manipulate the type of time-phased attribute denoted by type 502. For example, a time-phased attribute typically defines methods for getting and setting values for a particular range. Each time-phased bucket 510 is a data structure that indicates the range over which a value is effective. For example, each bucket 510 may comprise a bucket type 511, a value 512 for the range indicated, a start time period indication 513, a duration 514 that defines the range (for example, in number of hours, days, quarters, years, etc.), and an indicator 515 to the next bucket in the collection or that signifies the end of the list.

Note that the values of a time-phased attribute can be stored in the attribute block 404 delimited by tags in a manner that is similar to every other attribute value. In this case, a bucket collection is delimited by a pair of tags, which in turn contains nested tags that define the values (value, start time period, duration) for each time bucket. For example, if "Administration" is the tag name of a time-phased (labor) attribute type, then the cache for the time buckets may read as:

```
<Administration>
    <Bucket Collection>
        < Bucket>
            100, 1/1/2003, 30
        </Bucket>
        <Bucket>
            250, 2/1/2003, 28
        </Bucket>
        ...
    </Bucket Collection>
</Administration>
```

The text "100, Jan. 1, 2003, 30" in this example indicates 100 units (of labor), a start date of Jan. 1, 2003, and a duration of 30 days. The value of each bucket type is preferably stored in its smallest unit, so that it can be easily converted to other time period units as needed.

Figure 6:
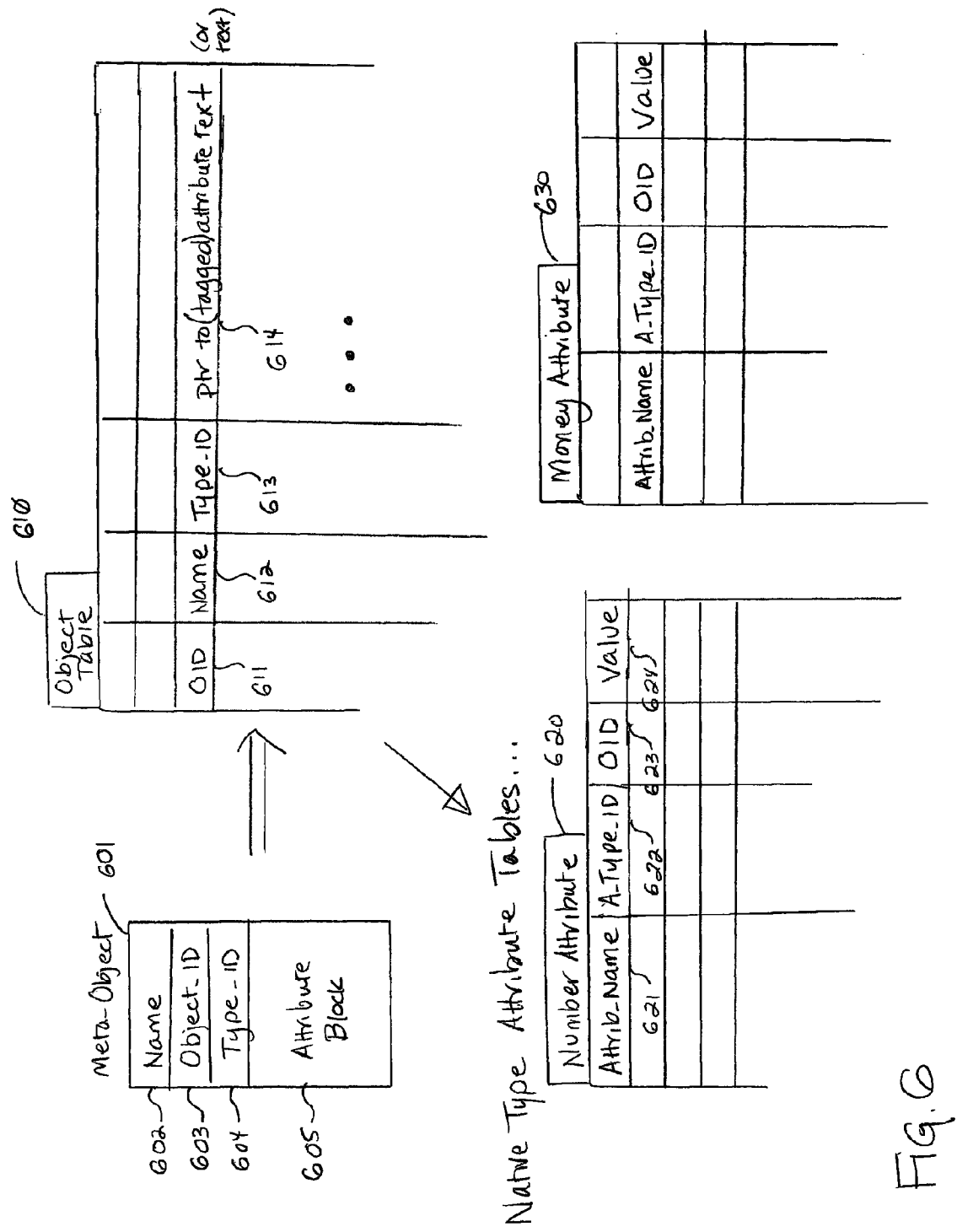
FIG. 6 is a block diagram of an example storage representation of a meta-object.

Since a typical application that incorporates a MODMS creates and manages a very large collection of data, the physical representation of meta-objects can effect the efficiency of the application. In a typical implementation of a MODMS, each meta-object is stored as records in a multitude of tables, which are accessed by the management and analysis components of the MODMS as needed. FIG. 6 is a block diagram of an example storage representation of a meta-object. In FIG. 6, instantiated meta-object 601 is an abstract data structure representation of the meta-object 400 shown in FIG. 4 and contains the same fields: name 602; an object identifier 603; an identification of the object type 604; an attribute block 605, and other fields (not shown). The instantiated meta-object 601 is shown stored as records in object table 610 and native attribute tables 620 and 630. Only some of the tables used to represent meta-object 601 are shown in FIG. 6. For each object, the MODMS stores a record in object table 610 that contains the object identifier 611, the name of the object 612, an identifier of the object type 613, and an indicator 614 to the (tagged) attribute block. One skilled in the art will recognize that instead of an indicator to the attribute block, the tagged text may be stored in the object table itself. The fields in each record in object table 610 thus correspond to the meta-object data structure 601. For each attribute indicated by the attribute block indicator 614, the MODMS also stores a record in a table that corresponds to the "native" type of the attribute, thus cross-referencing the meta-objects by native attribute type. For example, if the attribute block contains an attribute that ultimately resolves to a "number," then a record is created in a number attribute table 620 that indexes the meta-object 601. Or, for example, if the attribute block contains an attribute that is of a type that is ultimately a money attribute, then a record is created in a money attribute table 630. Example native attribute types include such types as numbers, dates, money, text, flags, and time-phase attributes, although one skilled in the art will recognize that depending upon the use of the MODMS, different native types may be useful. Storage of each attribute in these various native attribute type tables allows attributes to be indexed and accessed efficiently based upon their types, as opposed to searching each instantiated meta-object for instances that have attributes of a specific type. This capability may be useful, for example, when an attribute definition is changed and all of the objects that have been instantiated using that definition need to be updated accordingly. Thus, each record in a native type attribute table indicates the object identifier 623 of the corresponding instantiated meta-object 601 that contains an attribute value of that type. For example, each record in number attribute table 620 stores the attribute name 621; an identifier of the attribute (sub)type 622; the identifier of the corresponding instantiated meta-object 623; and the value 624 specified for that attribute in the instantiated meta-object.

Figure 7:
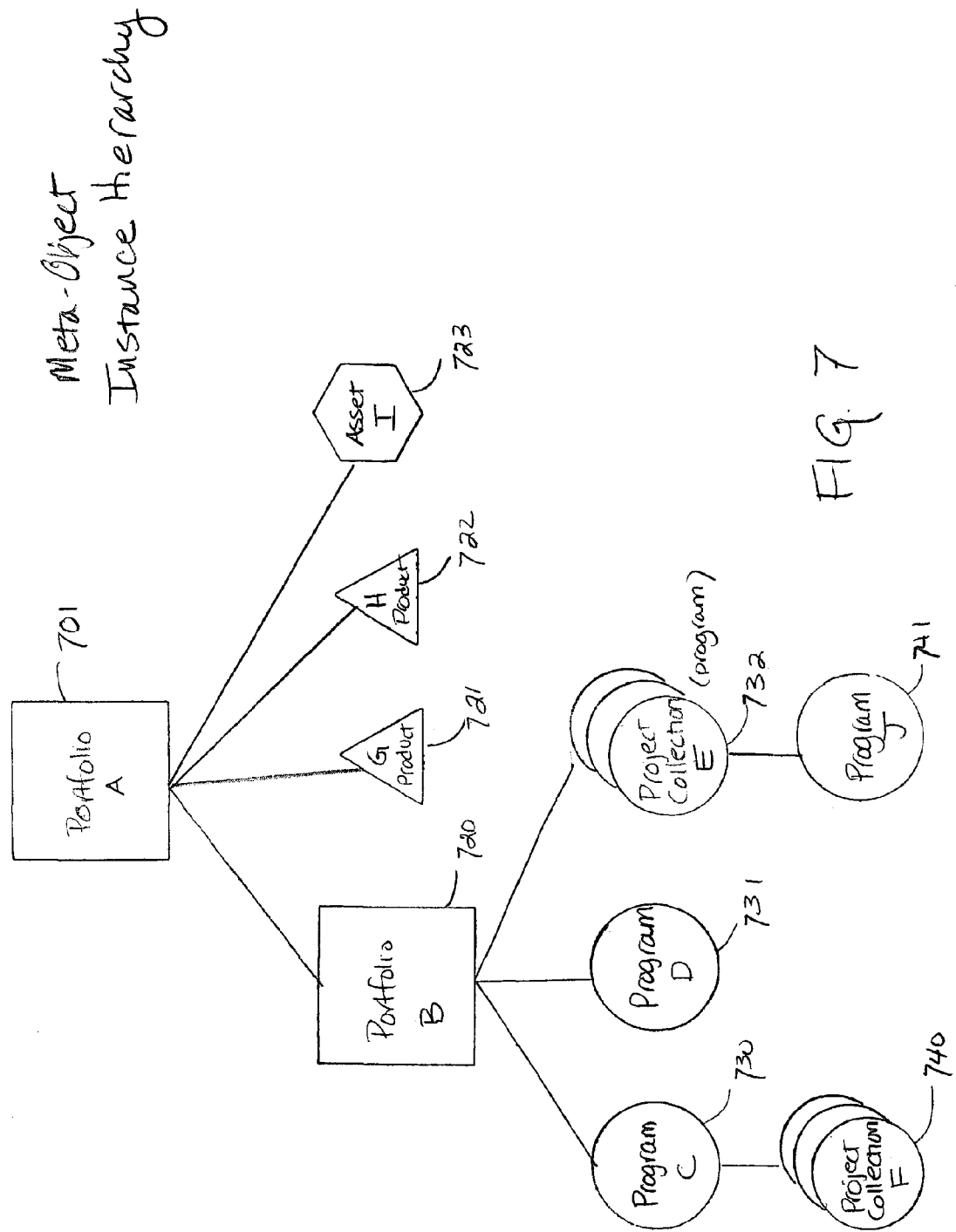
FIG. 7 is a block diagram of an abstraction of an example meta-object instance hierarchy created using an example Meta-Object Data Management System.

As previously mentioned, a meta-object is instantiated as part of a hierarchy of object instances. FIG. 7 is a block diagram of an abstraction of an example meta-object instance hierarchy created using an example Meta-Object Data Management System. The meta-object instance hierarchy defines the containment relationships of the instantiated meta-objects and is independent of the object type definitions. That is, any meta-object can be a child of any other meta-object providing it is instantiated as a child of that meta-object. This allows, for example, different types of investments to become part of other types of investments and to "behave" like they belong to the parent investment without worrying about the strict inheritance rules of traditional object-oriented programming techniques. (Using traditional object-oriented techniques, an object can be manipulated using the same methods as its "parent" object of a different object type only if the child object type definition is derived when it is created from the parent object type definition.) So, in FIG. 7, for example, a portfolio "A" meta-object 701 contains a portfolio "B" meta-object 720; two product "F" and "G" meta-objects 721 and 722; and an asset "I" meta-object 723. Further, the portfolio "B" meta-object 720 contains a project collection "E" meta-object 732; program "C" meta-object 730, and program "D" meta-object 731. The program "C" meta-object 730 further contains a project collection "F" meta-object 740. Conversely, project collection "E" meta-object 732 contains a program "J" meta-object 741. Thus, in one case a program type meta-object is a parent of a project collection type meta-object; whereas, in the other case, a project collection meta-object is a parent of a program meta-object. Thus, the containment relationships define the object ancestral relationships and not the object definitions themselves.

Figure 8:
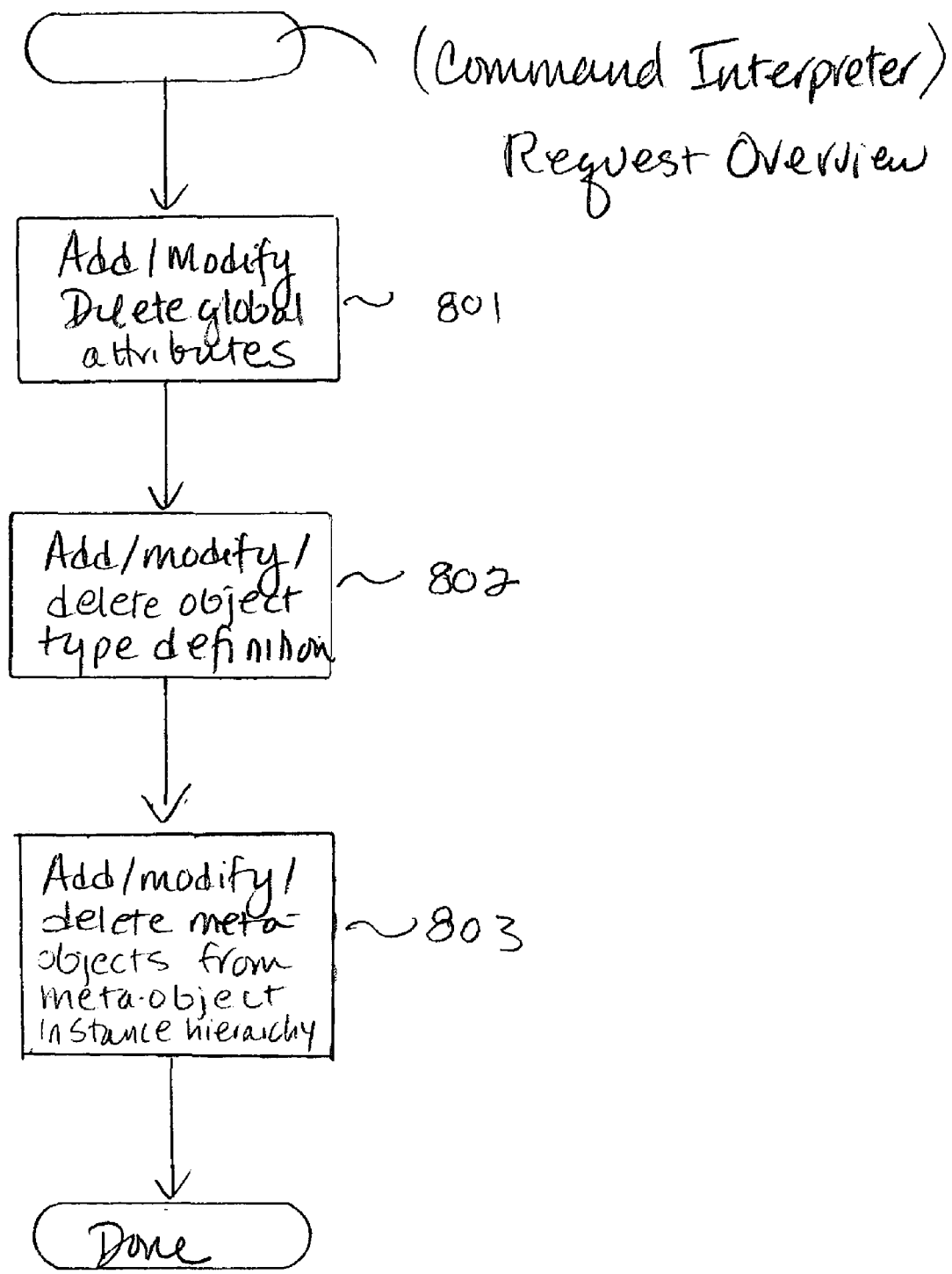
FIG. 8 is an example overview flow diagram of a command interpreter for an example Meta-Object Data Management System.

Once meta-objects have been instantiated to correspond to the initial data set, a command interpreter is invoked to manage the data and to provide analysis functions. FIG. 8 is an example overview flow diagram of a command interpreter for an example Meta-Object Data Management System. In step 801, the MODMS allows a user (for example, an administrator of an application that incorporates the MODMS) to add, modify, or delete global attributes. An example global attributes table was described with reference to FIG. 2. In step 802, the MODMS allows a user to add, modify, or delete an object type definition such as that described with reference to FIG. 3. In step 803, the MODMS allows a user to add, modify, or delete instantiated meta-objects from the meta-object instance hierarchy, for example, the hierarchy shown with reference to FIG. 7.

One skilled in the art will recognize that there are many well-known methods for implementing the addition, deletion, and modification of global attributes and the addition and deletion of object type definitions and of instantiated meta-objects. For example, an interface such as a dialog box-based interface, a form based application, or a direct manipulation interface can be used to modify tables that store global attributes, object type definitions, and meta-objects. As mentioned previously, modifications to an object type definition, however, result in automatic adjustments to instantiated objects. Thus, when an object type definition is modified, the MODMS preferably locates all instantiated objects of that object type and modifies their contents accordingly to bring them up to date. FIGS. 9-12 describe some of the routines used to modify object type definitions and to automatically adjust instantiated objects as a result. Analysis routines are typically tied to the applications that incorporate the MODMS and so are discussed as they relate to datasheet capabilities of an example portfolio management system embodiment described with reference to FIGS. 17-28.

Figure 9:
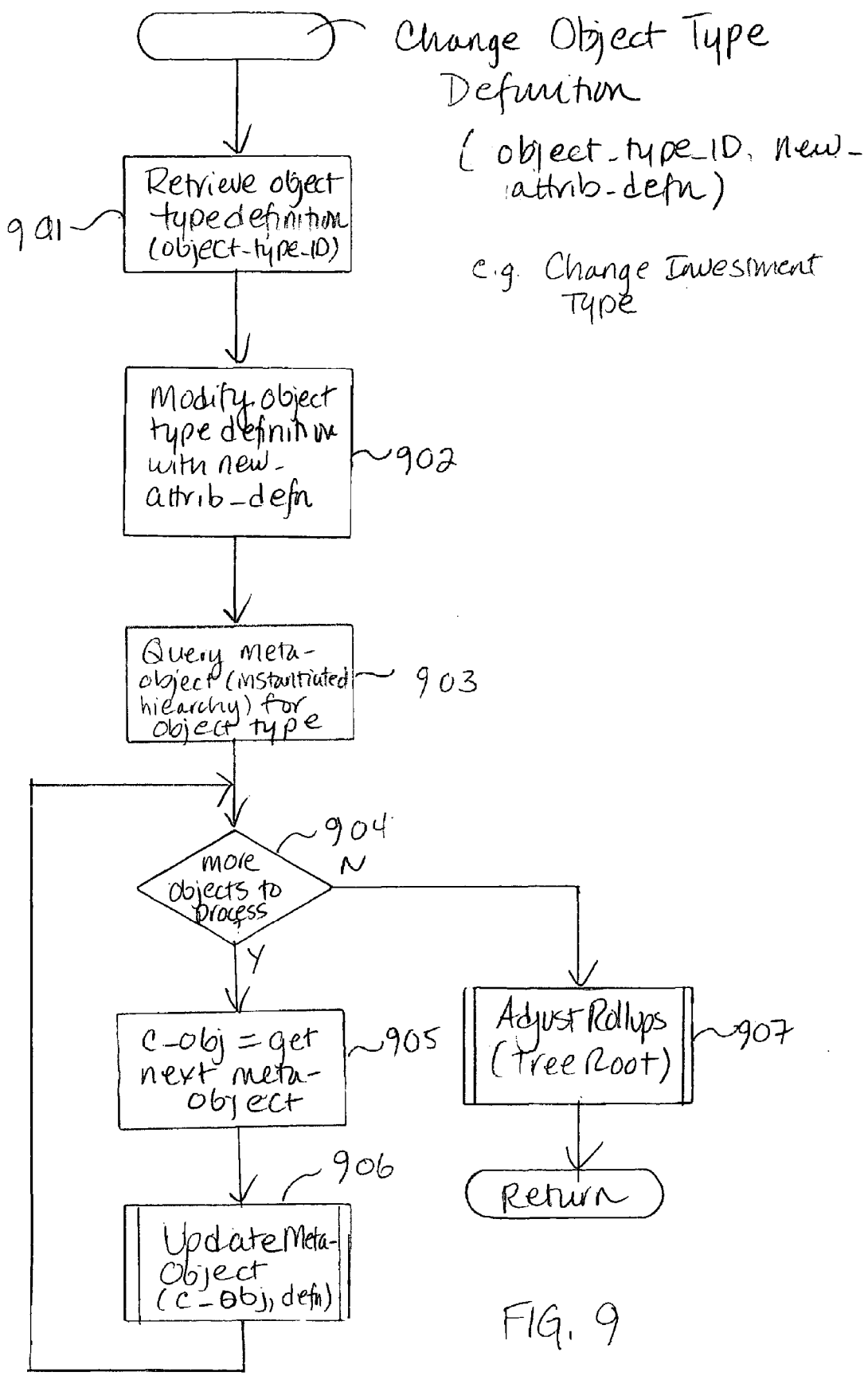
FIG. 9 is an example flow diagram of a Change Object Type Definition routine for modifying an object type definition in an example Meta-Object Data Management System.

FIG. 9 is an example flow diagram of a Change Object Type Definition routine for modifying an object type definition in an example Meta-Object Data Management System. This routine can be used, for example, to change the attributes of an investment type such as a "project." The routine is shown with steps for modifying an object type by adding a new attribute definition, and assumes a higher level user interface for selection of the change to be made (i.e., what attribute to delete or add). One skilled in the art will easily recognize how to modify the routine to change an existing attribute by deleting a designated one and replacing it with a new attribute definition or how to modify it in other ways. The routine thus takes as input a designation of the object type whose definition is to be modified, and a new attribute definition.

Specifically, in step 901, the MODMS retrieves the object type definition designated by the object_type_ID input parameter. In step 902, the MODMS modifies the retrieved object type definition by adding the new attribute definition that was designated as an input parameter to the routine. This new attribute definition is typically provided, for example, by an I/O interface to an administrator that is permitted to change the definition of attributes in a global attribute table. Next, in step 903, the MODMS queries the meta-object instantiation hierarchy to locate all of the instantiated objects of the designated object type. Since each stored meta-object includes an indication of its object type, the instantiation hierarchy is searched based upon that field. Steps 904-907 execute a loop that, for each matching meta-object, updates the meta-object with the new attribute definition and adjusts attributes that have rollup characteristics as necessary. More specifically, in step 904, the routine determines whether there are more meta-objects to process and, if so, continues in step 905, else continues in step 907. In step 905, the next instantiated meta-object is determined. Then, in step 906, an Update Meta-Object routine is invoked to add the new attribute definition to the current instantiated meta-object being processed and to perform any specified calculations, and the routine returns to the beginning of the loop in step 904. The Update Meta-Object routine is described further with reference to FIG. 10. In step 907, once all of the meta-objects that need to be updated have been updated, an Adjust Rollups routine is invoked to update the entire instantiation tree by adjusting any attributes with rollup values, since the definitions of instantiated meta-objects may have changed. The Adjust Rollups routine described further with reference to FIG. 11.

Figure 10:
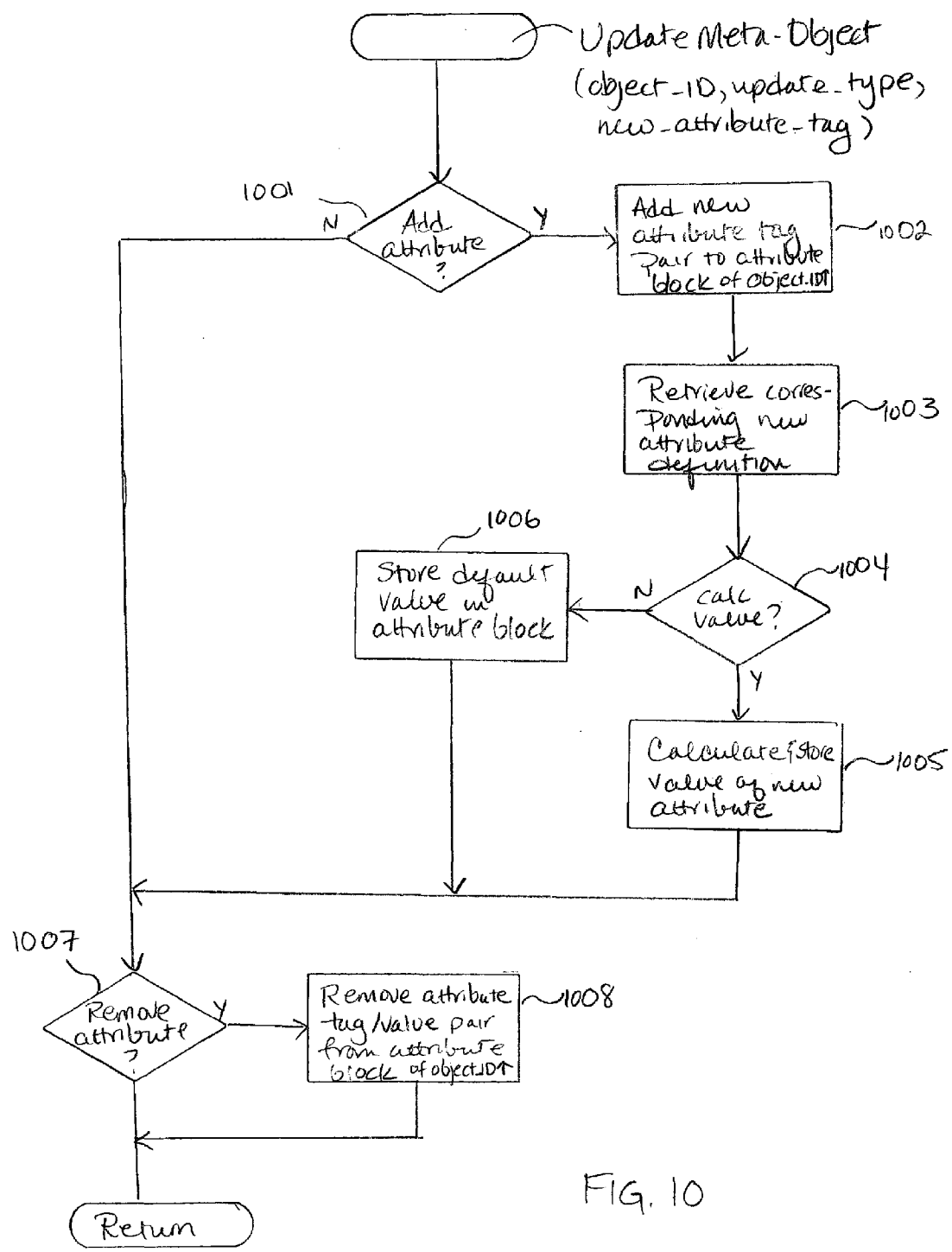
FIG. 10 is an example flow diagram of an Update Meta-Object routine for modifying an instantiated meta-object in an example Meta-Object Data Management System when its object type definition has changed.

FIG. 10 is an example flow diagram of an Update Meta-Object routine for modifying an instantiated meta-object in an example Meta-Object Data Management System when its object type definition has changed. There are different ways that an object type definition may have been changed and subsequently affect instantiated objects. For example, a new attribute (hence, a new attribute definition) may have been added to the object type, an attribute may have been removed from the object type, or other parts of the definition of an attribute may have been changed. One skilled in the art will recognize that there are may ways to implement the Update Meta-Object function to update instantiated objects of a modified object type and that, if an attribute was changed in the underlying object type definition as opposed to added or deleted, update operations can be simplified by treating modification the same as an addition followed by a deletion. The example routine shown in FIG. 10 either removes an existing attribute tag/value pair from an attribute block of an instantiated meta-object or adds a new attribute tag/value pair to the attribute block. Any calculations indicated by the corresponding new attribute definition are performed as necessary. Thus, several input parameters are specified for the Update Meta-Object routine including a designated meta-object instance to update, the type of update needed (e.g., add or delete or both for a modification), and a designated attribute tag (from which a new attribute definition can be determined).

More specifically, in step 1001, if a new attribute is to be added to the meta-object instance indicated by the designated object identifier, then the routine continues in step 1002, else continues in step 1007. In step 1002, the designated new attribute tag and a corresponding ending tag are added to the attribute block (for example, attribute block 605 in FIG. 6). In step 1003, the attribute definition that corresponds to the designated tag is retrieved from, for example, the global attributes table. In step 1004, if the retrieved attribute definition indicates that the value of the attribute is to be calculated, then in step 1005 the calculation is performed and the resultant value stored in the attribute block of the indicated meta-object instance. Otherwise, in step 1006, a default value indicated by the retrieved attribute definition is stored between the attribute tag pair in the attribute block. In step 1007, if an attribute is to be removed from the meta-object instance indicated by the designated object identifier, then the routine continues in step 1008, else returns. In step 1008, the attribute tag/value pair that corresponds to the designated attribute tag is removed from or somehow nullified in the attribute block, and the routine then returns.

Figure 11:
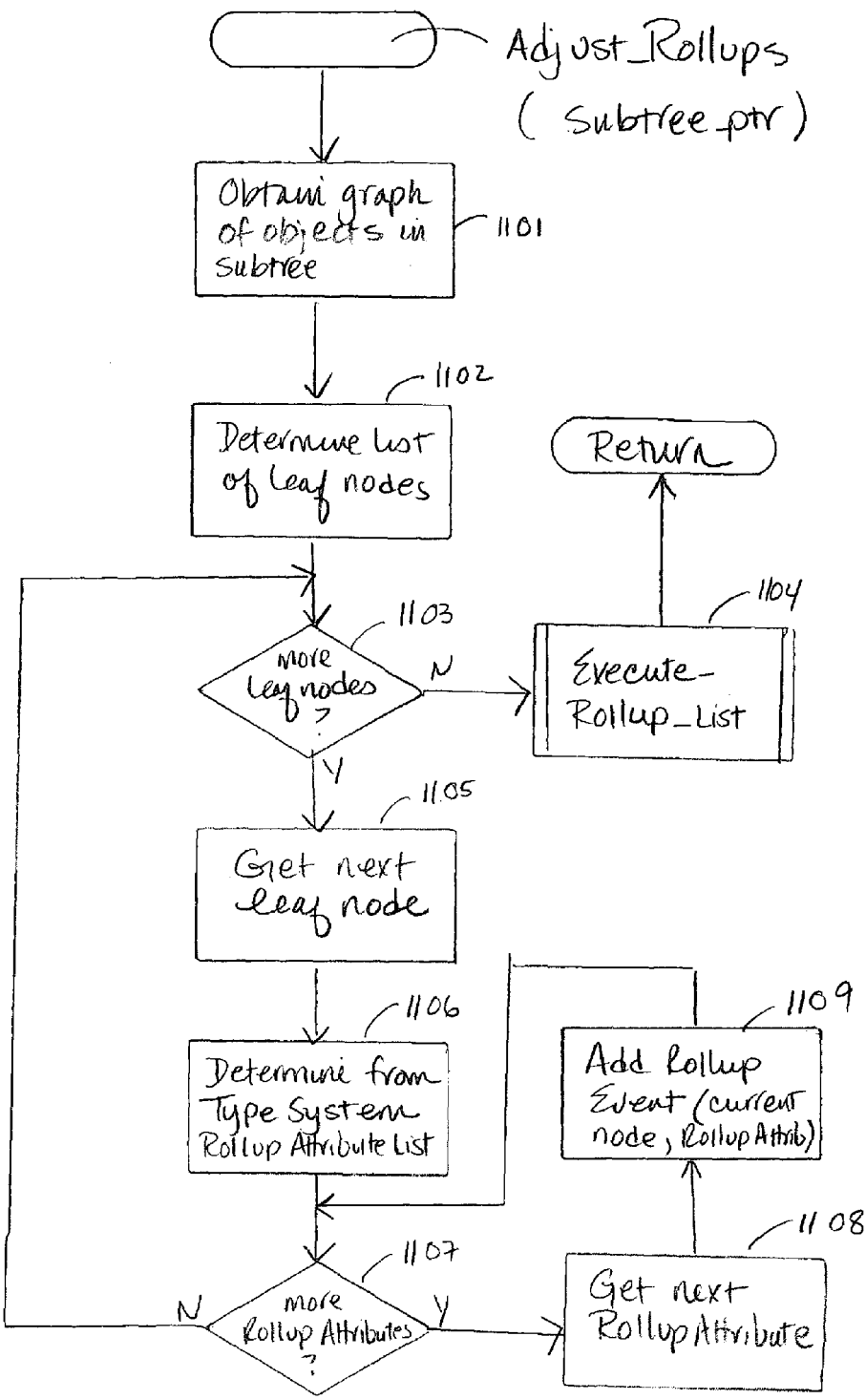
FIG. 11 is an example flow diagram of an Adjust Rollups routine for adjusting rollup attributes.

FIG. 11 is an example flow diagram of an Adjust Rollups routine for adjusting rollup attributes. This routine takes a designated sub-tree of a meta-object instantiation hierarchy and, from the leaf nodes on up, executes all attribute rollup functions that exist in any node. The rollup functions are preferably executed from the bottom of the tree upward so that they are properly aggregated progressively at each higher level in the hierarchy and thus properly reflect the values of the children nodes. There are many methods for performing adjustment of rollups, and the one illustrated keeps track of in a rollup event list (accumulates indicators to) all of the nodes that need to have their rollup functions executed in the proper order, and then executes the rollup functions of these nodes (as rollup events) in order accordingly.

Specifically, in step 1101, the routine obtains a graph of all the objects in the meta-object instance hierarchy from the designated sub-tree pointer downward to the leaf nodes. One skilled in the art will recognize that the implementation of this step is typically dependent upon the storage representation for the instantiation hierarchy. In step 1102, the routine determines a list of the leaf nodes of that sub-tree. In steps 1103-1109, the routine executes a loop for each leaf node to determine whether it has a rolled-up attribute and, if so, adds an event corresponding to that rollup to a list of rollup events to be executed. After the list is accumulated, the rollup events are executed in the order that they were added to the list, thus insuring proper aggregation. More specifically, in step 1103, the routine determines whether there are any more leaf nodes in the graph, and, if so, continues in step 1105, else continues in step 1104. In step 1105, the routine gets the next leaf node indicated by the sub-tree graph. In step 1106, the routine determines from the object type system whether the current node corresponds to a type of object which has rolled-up attributes. In one embodiment, each object type has a list of the attributes it contains (an object-specific rollup attribute list) that have values that roll up (referred to for convenience as rollup attributes). Alternatively, a list of attributes that need to be rolled-up for that object type can be dynamically generated. Steps 1107-1109 execute a loop for each of these rollup attributes to add a rollup event to the roll up list. Specifically, in step 1107, if there are more rollup attributes for that object to be processed, then the routine continues in step 1108, else returns to look at the next leaf node in step 1103. In step 1108, the routine gets the next rollup attribute from the object-specific rollup attribute list. In step 1109, the routine adds a rollup event that corresponds to that rollup attribute to the rollup event list. A rollup event includes, for example, an indication of the current node in the instantiation sub-tree and a pointer to an attribute that needs to be rolled up so that, when the event is executed, the correct rollup function can be found and the corresponding value(s) of the attribute can be determined. Example code for an example rollup event is described with reference to FIG. 12. In step 1104, once the routine determines that there are no more leaf nodes to process, the routine executes the Execute_Rollup_List routine (not shown) to execute all of the rollup events on the rollup event list that have been accumulated thus far, and then returns. Note that it is only necessary to examine the leaf nodes initially and to add rollup events for the leaf nodes, because each rollup event for a leaf node in turn will add rollup events for the parent node of each of these nodes (see FIG. 12). These nodes will in turn add rollup events for their parent node, and the entire process will bubble up similarly so that eventually all necessary rollup events from the leaf node all the way to the highest parent node across each level of the instantiation sub-tree will be added and executed.

Figure 12:
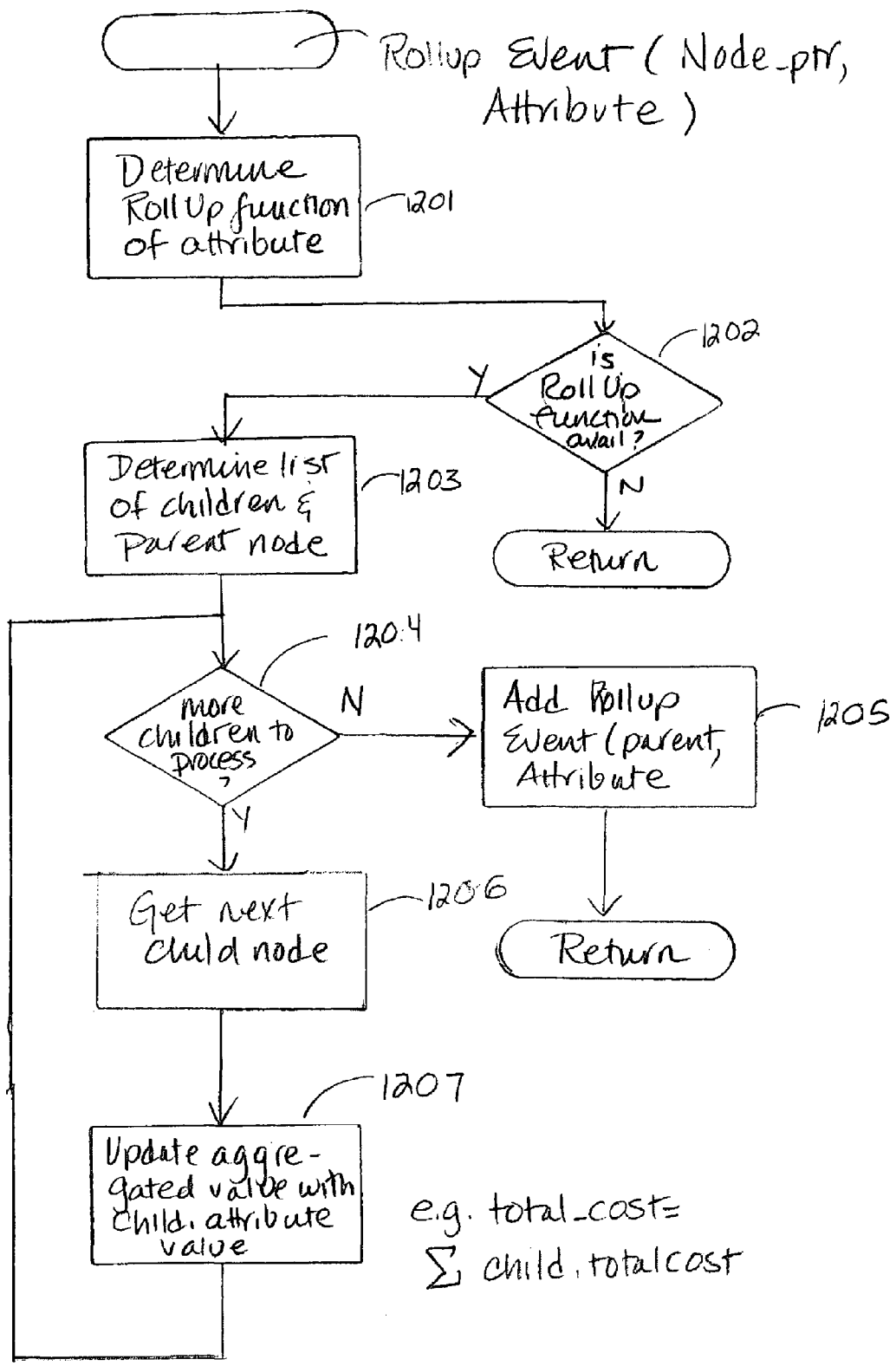
FIG. 12 is an example flow diagram of steps executed by a typical rollup event.

As described, rollup event code is executed for each rollup event that has been added to the rollup event list. FIG. 12 is an example flow diagram of steps executed by a typical rollup event. One skilled in the art will recognize that other code are possible and that this is just one example for ensuring that attributes are rolled up from the leaf nodes all the way to the root node of the designated sub-tree. In step 1201, the rollup event code determines, based upon a designated attribute and node pointer, the particular rollup function for the designated attribute. In step 1202, if there is no rollup function specified (the definition is incomplete) then the code returns, other continues in step 1203. In step 1203, the rollup event code determines a list of the children of the current designated node and the parent node of the designated node. In steps 1204-1207, the routine executes a loop to aggregate the corresponding attribute values of the designated attribute of the children nodes with the designated node so that the aggregated value can be stored in the parent node. The code also adds a rollup event corresponding to the parent node and the designated attribute so that the process can bubble up the hierarchy. More specifically, in step 1204, the routine determines whether there are more children nodes of the designated node, and, if so, continues in step 1206, else continues in step 1205. In step 1206, the routine gets the next child node to process. In step 1207, the routine updates an (accumulating) aggregated value with the corresponding attribute value from the current child and saves it until all of the values are retrieved from all the children of the designated node. For example, if the total cost is the attribute being computed and the rollup function is a summation function, then step 1207 contains a temporary variable for collecting a sum of the total cost attribute of each of the children nodes. The routine then returns to step 1204 to look for the next child node to process. In step 1205, when there are no more children nodes of the designated node to process, the routine adds a rollup event to correspond to the parent node of the designated node and designates the current attribute being processed, and then returns.

Figure 13:
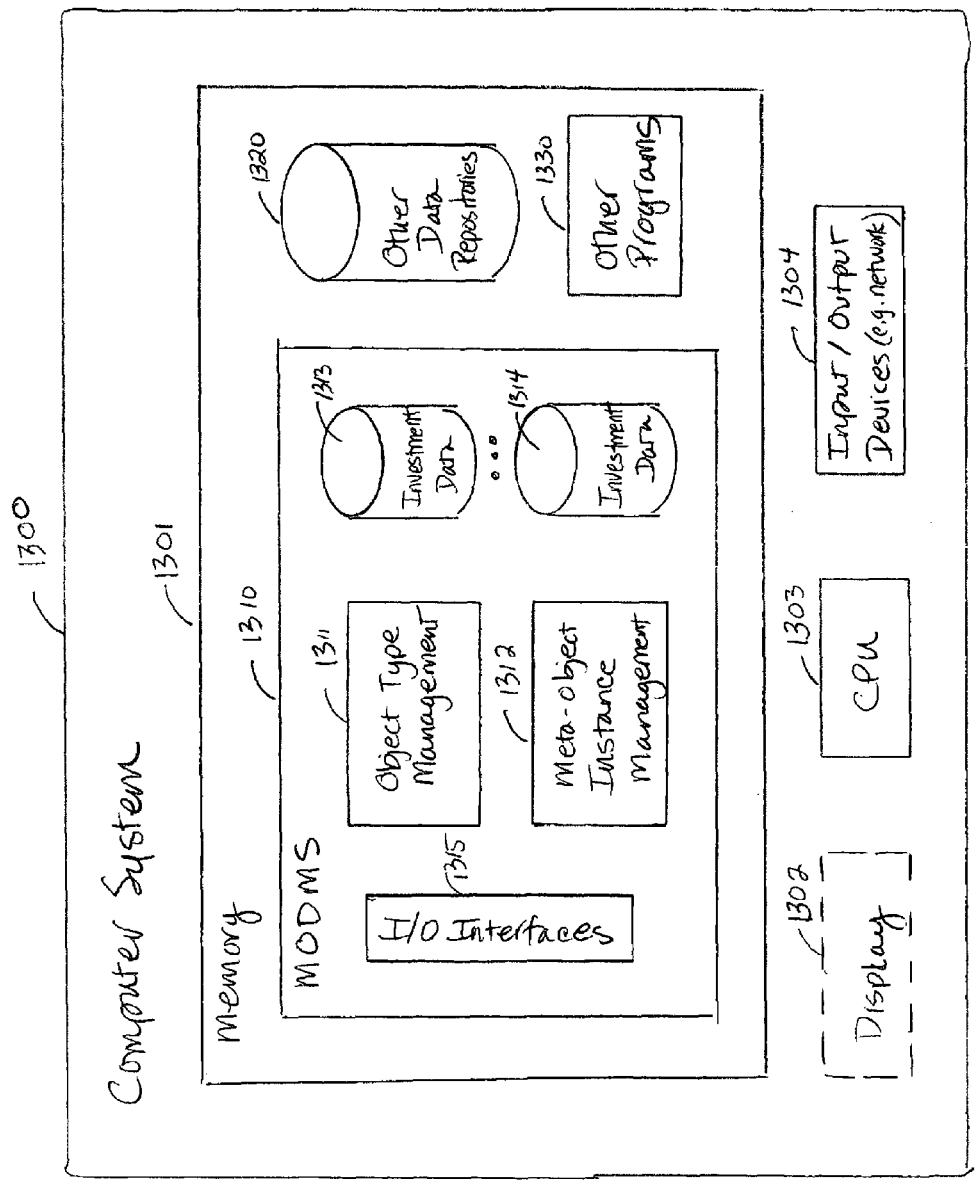
FIG. 13 is an example block diagram of a general purpose computer system for practicing embodiments of a Meta-Object Data Management System.

FIG. 13 is an example block diagram of a general purpose computer system for practicing embodiments of a Meta-Object Data Management System. The general purpose computer system 1300 may comprise one or more server and/or client computing systems and may span distributed locations. In addition, each block shown may represent one or more such blocks as appropriate to a specific embodiment or may be combined with other blocks. Moreover, the various blocks of the Meta-Object Data Management System 1310 may physically reside on one or more machines, which use standard interprocess communication mechanisms to communicate with each other.

In the embodiment shown, computer system 1300 comprises a computer memory ("memory") 1301, an optional display 1302, a Central Processing Unit ("CPU") 1303, and Input/Output devices 1304. The Meta-Object Data Management System ("MODMS") 1310 is shown residing in the memory 1301. The components of the MODMS 1310 preferably execute on CPU 1303 and manage the generation, management, and use of meta-objects, as described in previous figures. Other downloaded code 1330 and potentially other data repositories 1320 also reside in the memory 1310, and preferably execute on one or more CPU's 1303. In a typical embodiment, the MODMS 1310 includes an object type management subsystem 1311, a meta-object instance management subsystem 1312, input/output interfaces 1315, and one or more data repositories 1314, including, for example, investment data.

In an example embodiment, components of the MODMS 1310 are implemented using standard programming techniques. One skilled in the art will recognize that the components 1311-1315 lend themselves to distributed, object-oriented implementations and can be implemented to use relational database management systems, web-based (Internet or internet) interfaces, etc. However, any of the MODMS components 1311-1315 may be implemented using more monolithic programming techniques as well. In addition, programming interfaces to the data stored by the MODMS process can be available by standard means such as through C, C++, C#, and Java API and through scripting languages such as XML, or through web servers supporting such interfaces. The data repositories 1313 and 1314 are preferably implemented for scalability reasons as database systems rather than as text files, however any method for storing the application data and for storing the instantiated meta-objects may be used. In addition, some routines of the object type management subsystem 1311 and the meta-object instance management subsystems may be implemented as stored procedures, or methods attached to table "objects," although other techniques are equally effective.

One skilled in the art will recognize that the MODMS 1310 may be implemented in a distributed environment that is comprised of multiple, even heterogeneous, computer systems and networks. For example, in one embodiment, the object type management subsystem 1311, the meta-object instance management subsystem 1312, and the data repositories 1313-1314 are all located in physically different computer systems. In another embodiment, the type and instance subsystem components 1311 and 1312 of the MODMS 1310 are hosted each on a separate server machine and may be remotely located from the instantiated object and attribute tables which are stored in the data repositories 1313-1314. Different configurations and locations of programs and data are contemplated for use with techniques of the present invention. In example embodiments, these components may execute concurrently and asynchronously; thus the components may communicate using well-known message passing techniques. One skilled in the art will recognize that equivalent synchronous embodiments are also supported by an MODMS implementation. Also, other steps could be implemented for each routine, and in different orders, and in different routines, yet still achieve the functions of the MODMS.

Figure 14:
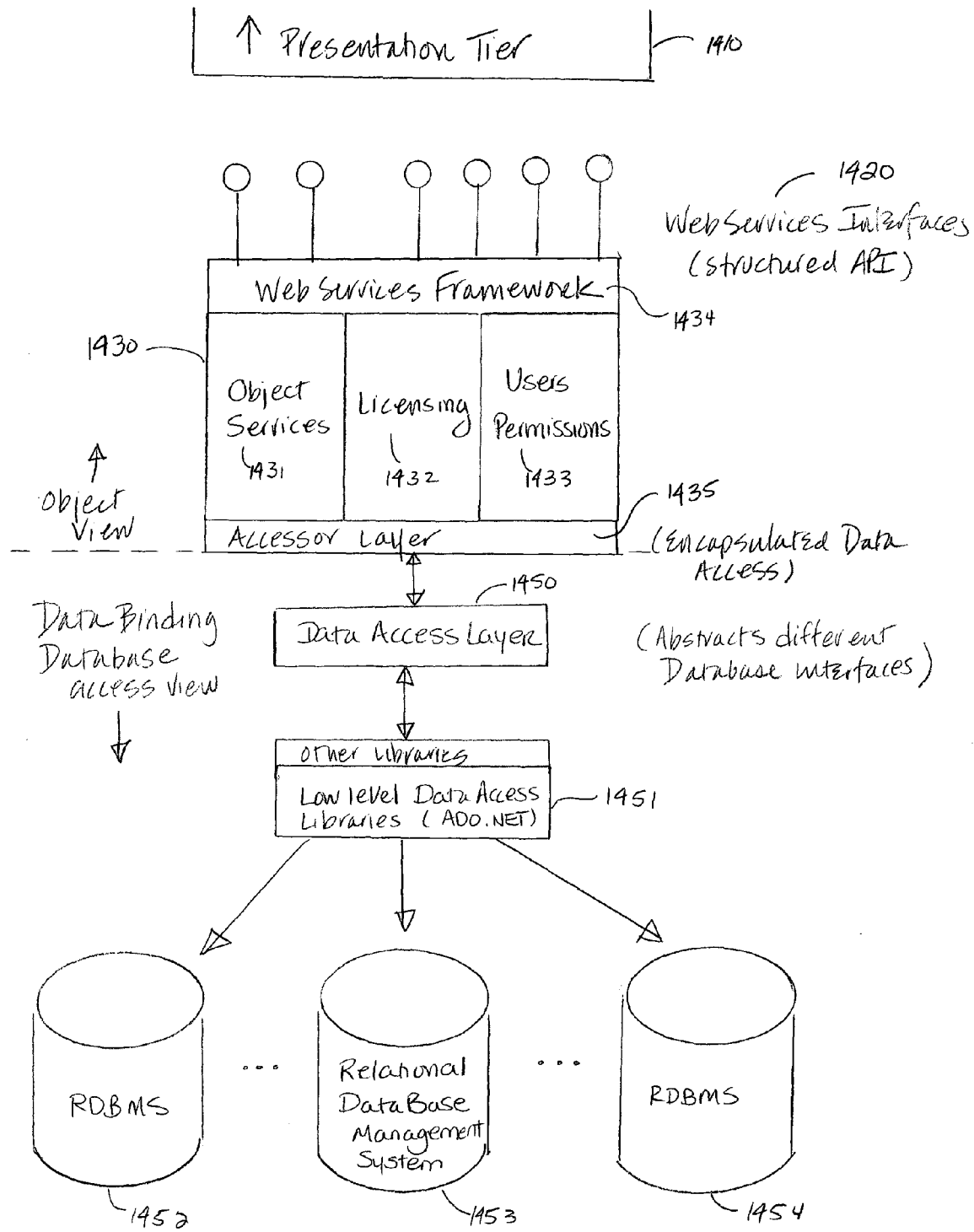
FIGS. 14 and 15 are example block diagrams of a client-server, network-based tiered architecture for implementing embodiments of a Meta-Object Data Management System.
Figure 15:
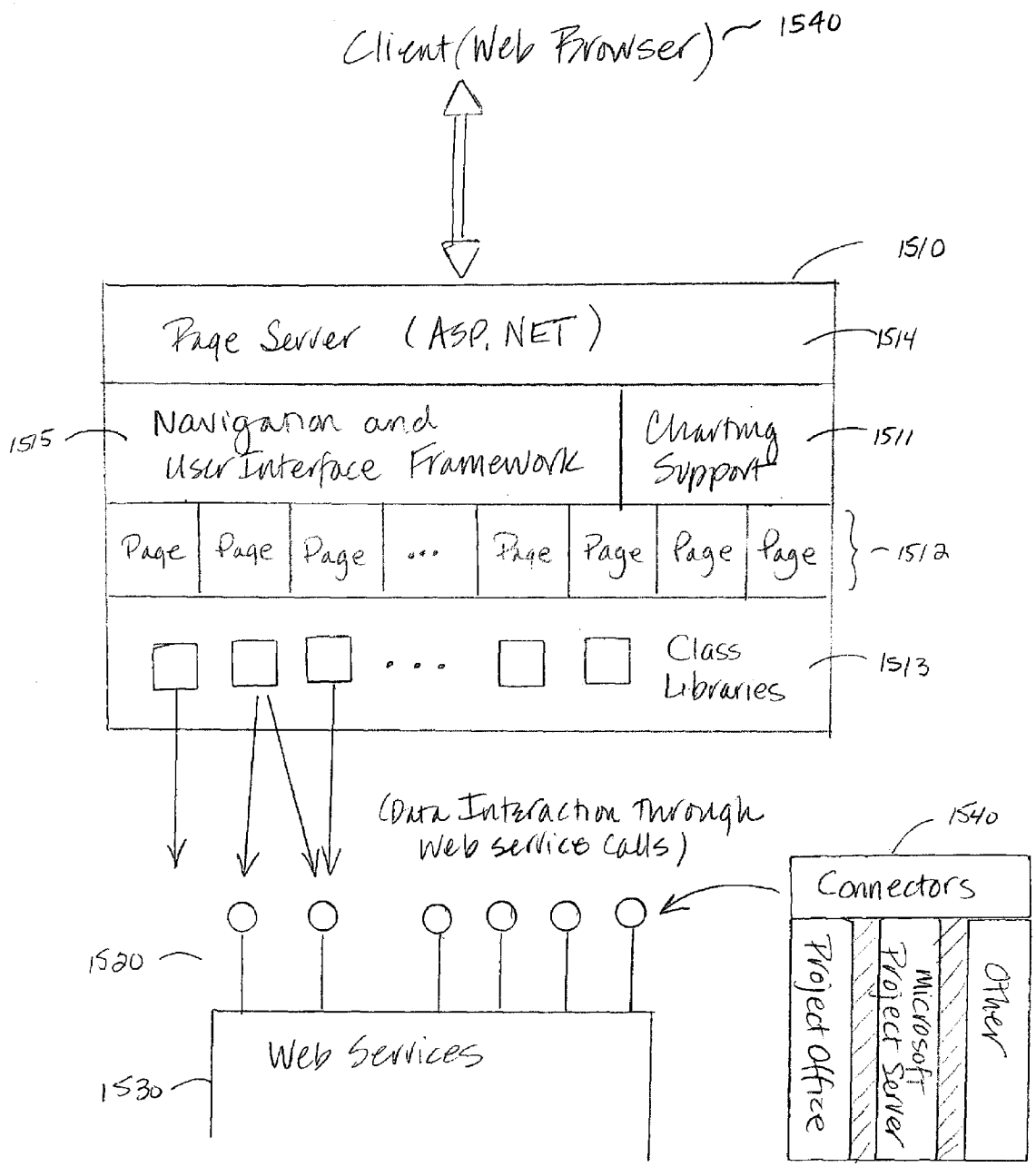

FIGS. 14 and 15 are example block diagrams of a client-server, network-based tiered architecture for implementing embodiments of a Meta-Object Data Management System. FIG. 14 illustrates how an MODMS may be implemented at the web services layer as web service interfaces and how the MODMS interacts with any type of presentation tier residing above it and with any data access tier residing below it.

So, for example, in FIG. 14, the web services interfaces 1420, which are typically structured application programming interfaces ("API"), communicate through encapsulated data access (data abstractions) to various databases. The layers in a data access layer bind the data abstractions into the various databases physically used in the system in order to manage the physical storage. For example, the web services interfaces 1420 communicate (eventually) through an accessor layer 1435 to a data access layer 1450, which communicates to lower level data access libraries 1451 (for example, ADO.NET). These access libraries 1451 provide interfaces to the various physical database management systems such as a relational database management systems 1452-1454. The web services layer 1430 contains web service interfaces (API) 1420 which are used by the presentation tier 1410 to access the various web services.

The web service layer 1430 provides support for the MODMS functions. The various capabilities of a MODMS are implemented as services, such as object services 1431, licensing services 1432, and user permissions and related services 1433. Access to the MODMS services is provided by web services framework 1434 through calls to the web services interfaces 1420.

As continued in FIG. 15, presentation tier 1510 (1410 in FIG. 14) interfaces with the MODMS services through calls to the various web services 1431-1433 using the web service interfaces 1520. In addition, various connectors 1540 to other third-party environments can interface through the web service interfaces 1520 to take advantage of the underlying technology. For example, connectors to programs such as Microsoft Project Server, and Pacific Edge's Project Office can interface through the web services interfaces 1520 to import data into the MODMS and to export data to those the third-party programs.

The presentation tier 1510 provides the input/output interface between, for example, a client web browser 1540 and the web services layer 1530 of the MODMS. The presentation layer 1510 typically comprises some type of page server 1514 (for example, ASP.NET); a navigation and user interface framework 1515; and various page definitions 1512 which are transported through the page server 1514 to the client web browser 1540. The pages 1512 may reference various class libraries provided by the system 1513. In addition, in some embodiments, the presentation layer 1510 may provide charting support 1511 and other application-specific modules (not shown).

Figure 16:
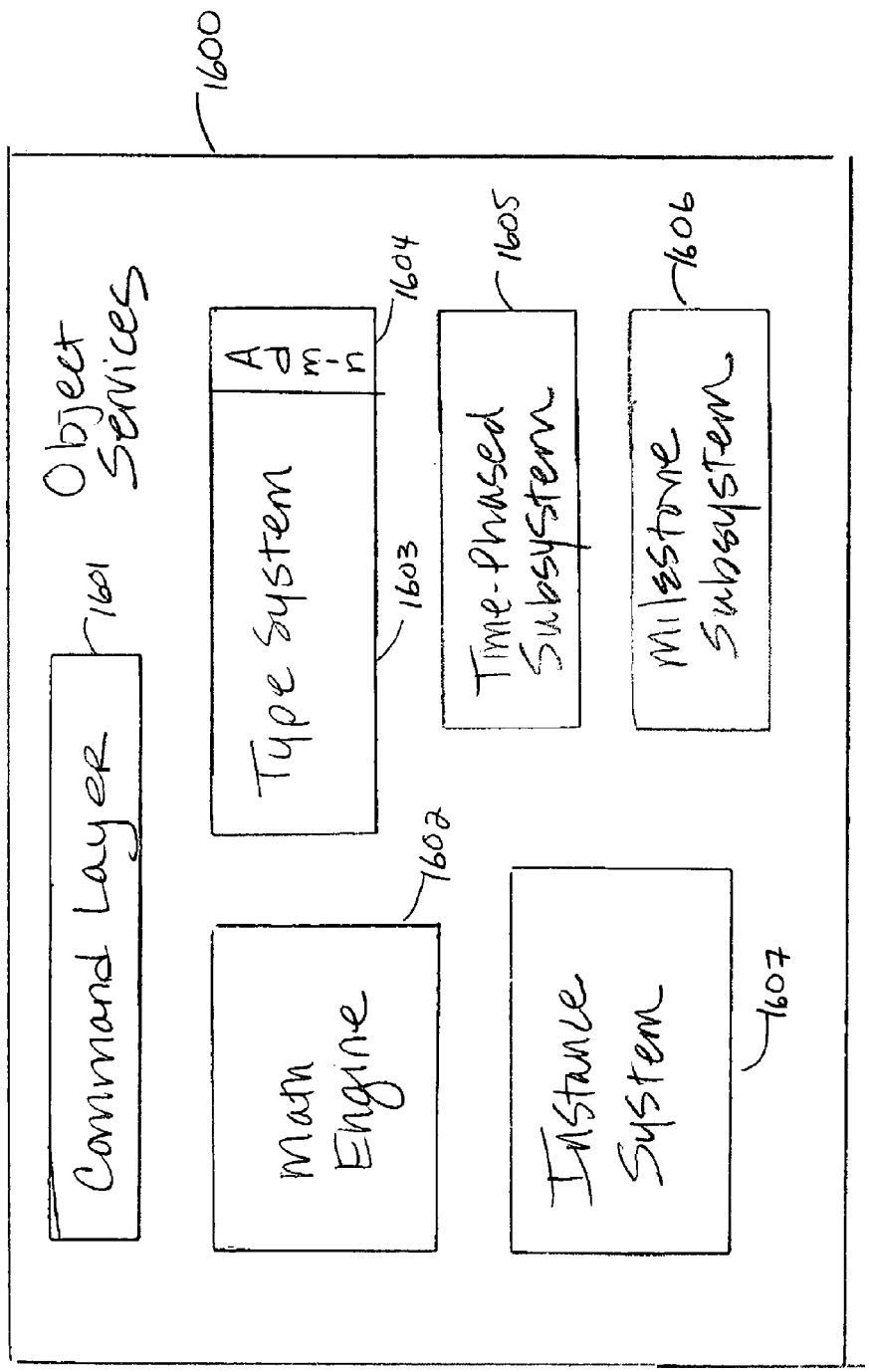
FIG. 16 is an example block diagram of components of an example object services layer of a Meta-Object Data Management System used to implement an example Enterprise Portfolio Management System.

In an example embodiment, the majority of the functions that were described with respect to FIGS. 1-12 are implemented in the object services layer 1531 of the web services 1530. FIG. 16 is an example block diagram of components of an example object services layer of a Meta-Object Data Management System used to implement an example Enterprise Portfolio Management System. To implement an MODMS, the object services 1600 comprises a command layer 1601; and various engines/subsystems 1602-1606 for implementing the functionality of the object type system and meta-object instantiation systems described earlier. For example, a typical object services layer 1600 may comprise an object instance system 1607; an object type system 1603 with an administration module 1604 for modifying object types; a time-phased subsystem 1605; a milestone subsystem 1606; and a math engine 1602. As described earlier, administrators use the type system module 1603 to define and manage object types in the system. The instance system 1607 is used to instantiate meta-objects of those types. The math engine 1602, time-phased subsystem 1605, and milestone subsystem 1606 are shown as supplemental components; however, one skilled in the art will recognize that their functionality may be incorporated into the other modules as appropriate.

As described in FIGS. 1-12, a meta-object data management system may be used to create applications such as an enterprise portfolio management system. In an enterprise portfolio management system, object types are created for each "investment" type to be managed by the system and, as portfolios are added to the system that contain investments, corresponding objects (meta-objects) are instantiated appropriately.

Figure 17:
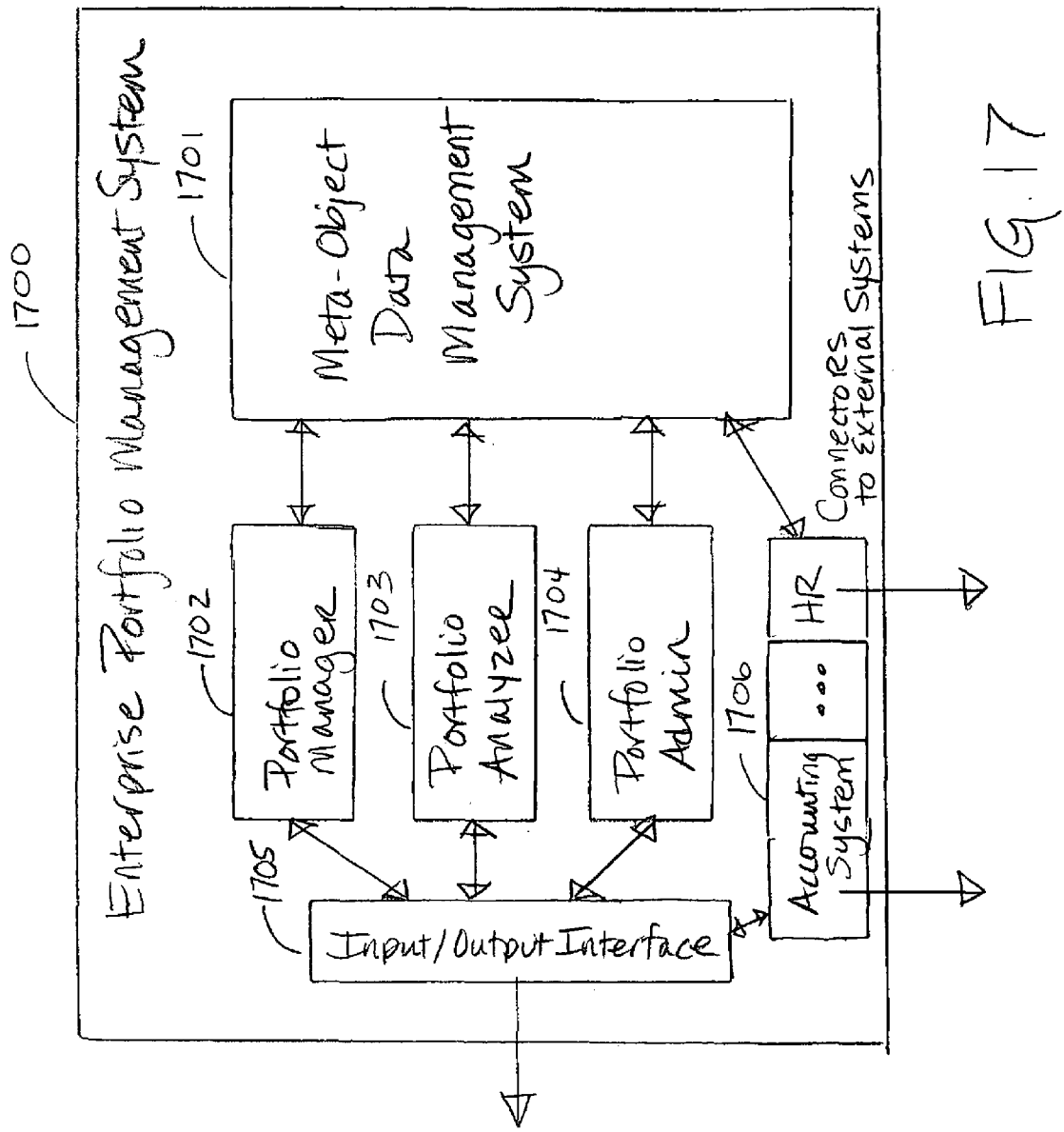
FIG. 17 is a block diagram of an example Enterprise Portfolio Management System implemented using an example Meta-Object Data Management System.

FIG. 17 is a block diagram of an example Enterprise Portfolio Management System implemented using an example Meta-Object Data Management System. In an example embodiment, the enterprise portfolio management system 1700 comprises a portfolio manager 1702, a portfolio analyzer 1703, and a portfolio administration interface 1704. These components provide the different enterprise (investment) data management and analysis capabilities and are accessed by a user of the portfolio management system through an input/output interface 1705. Components 1702-1704 communicate with the meta-object data management system 1701 through the different programmatic interfaces (e.g., the web service interfaces shown in FIG. 14) that access the object services layer of the MODMS 1701. In addition, as discussed with respect to FIGS. 14 and 15, connector modules 1706 to external systems may also be present and access the meta-object data management system 1701. For example, connector modules 1706 may connect to accounting systems, human resource systems, and financial systems otherwise available in the enterprise. Further, these systems may be legacy applications that pre-existed the enterprise portfolio management system 1701.

Figure 18:
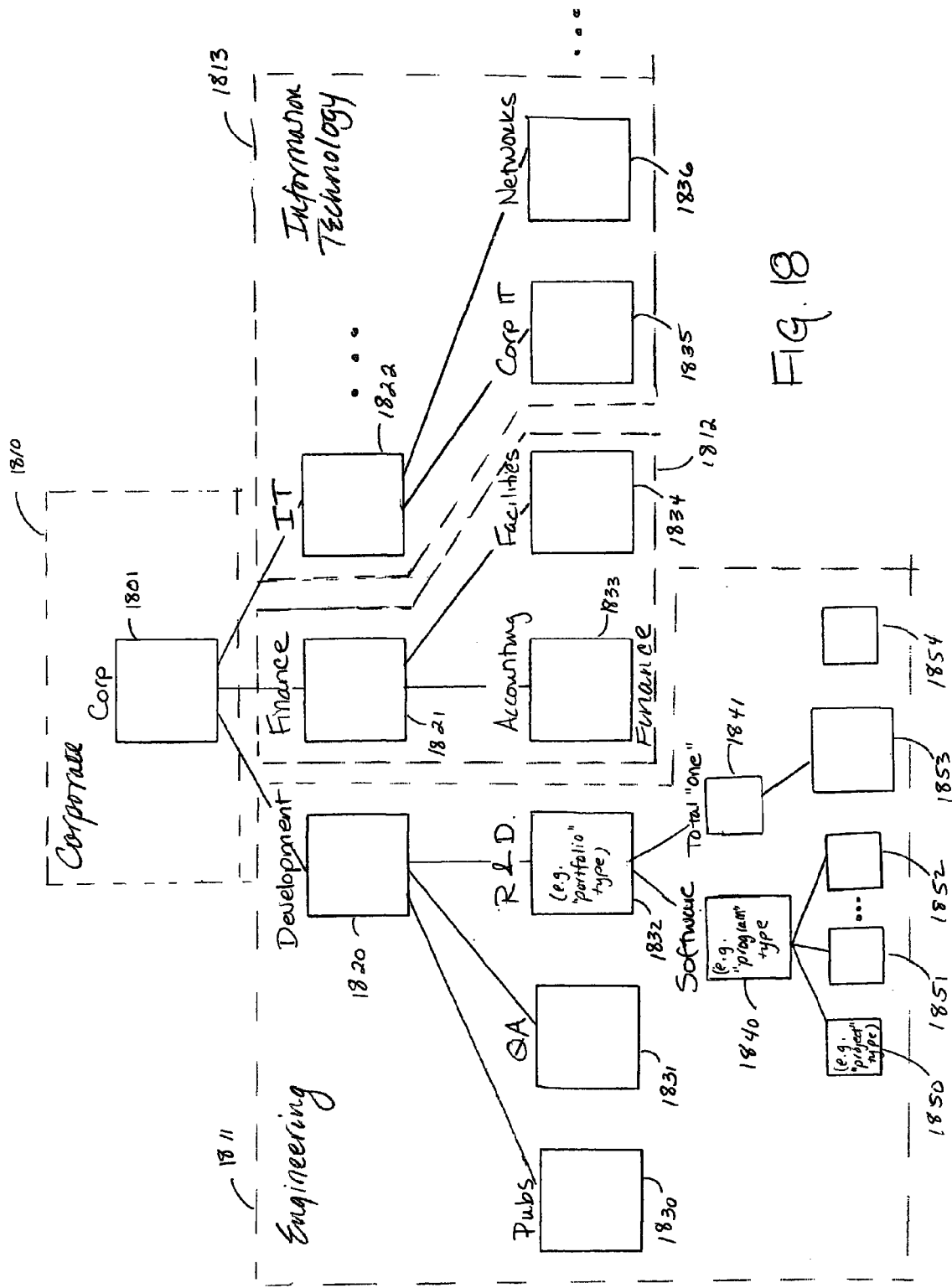
FIG. 18 is a block diagram of an example investment instance hierarchy of a hypothetical enterprise portfolio management system created using a Meta-Object Data Management System.

FIG. 18 is a block diagram of an example investment instance hierarchy of a hypothetical enterprise portfolio management system created using a Meta-Object Data Management System. For the purposes of FIG. 18, it is presumed that the enterprise organization comprises several sub-organizations including corporate management 1810, engineering 1811, finance 1812, and information technology 1813 portions of the organization. It is presumed also that each of the sub-organizations 1810-1813 comprise several departments, which each may desire to organize their own portfolio data, hence maintain and analyze investments, in their own particular ways. In addition, the investment data may be stored in data formats and on databases that are specific to that portion of the organization. So for example, as with most portfolio management systems, some portions of organizations within the enterprise may want to view the data in a partitioned fashion to analyze investments at a lower (more detailed) level, while other portions of the organization, such as the management executive committee members, may want to view all of the data of the various sub-organizations at a summary level. The different size boxes shown in FIG. 18 and linked to other size boxes, such as portfolio 1832, program 1840, project 1841, and project 1842 are provided to demonstrate that any type of investment can be contained in any other type of investment simply by virtue of its containment position within the hierarchy. So for example, a portfolio type object 1832 contains a project type object 1841, which contains a program type object 1853, even though elsewhere in the hierarchy, a program type object 1840 contains a project type object 1850 demonstrating the opposite containment relationship.

As described with respect to FIG. 17, the example enterprise portfolio management system comprises portfolio management functions, portfolio analysis functions, and portfolio administrative functions. Example screen displays of some of the functionality provided by these components are illustrated in Appendices A and C, which are herein incorporated by reference in their entirety. Appendix A includes screen displays from a portfolio management interface and a portfolio analysis interface to an executing portfolio management system. Appendix C illustrates screen displays that exemplify the capabilities of a charting subsystem, which allows multi-dimensional data to be redisplayed in a chart using modified sets of axes, without rebuilding the underlying chart definition. In the examples shown, the charting system is integrated into the portfolio analysis interface such that each chart is associated with a designated multi-dimensional view of the data.

FIGS. 19-28 describe in greater detail example functions of the portfolio manager and portfolio analyzer components of an example enterprise portfolio management system such as that shown in FIG. 17. One skilled in the art will recognize that the capabilities shown can be modified using well-known techniques to be suitable for the application desired.

Figure 19:
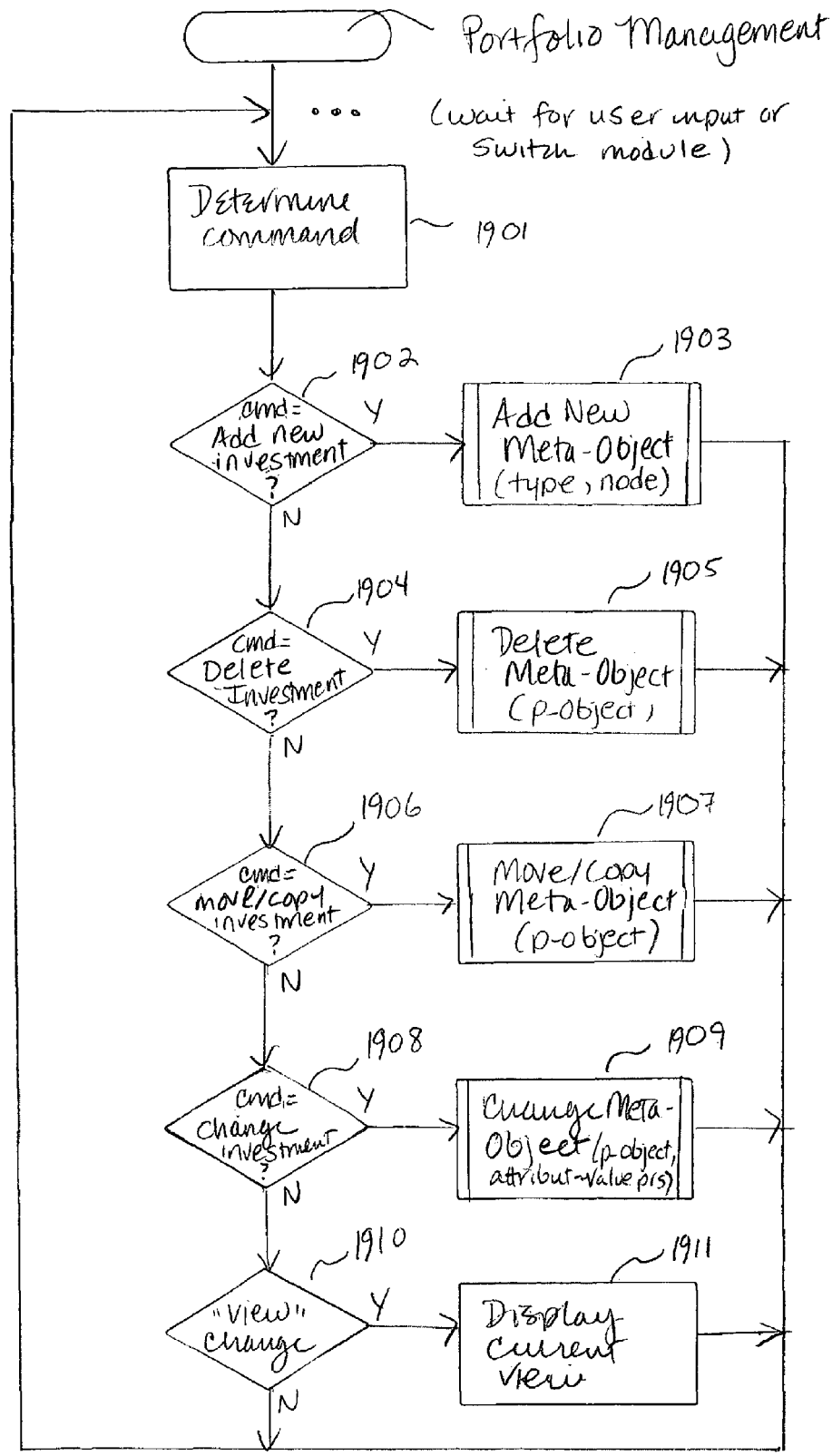
FIG. 19 is an overview flow diagram of example portfolio management functions of a portfolio manager component of an example Enterprise Portfolio Management System.

FIG. 19 is an overview flow diagram of example portfolio management functions of a portfolio manager component of an example Enterprise Portfolio Management System. The portfolio manager component of an enterprise portfolio management system is responsible for creating and managing the meta-object instances that correspond to investment data. One skilled in the art will recognize that the functions displayed in FIG. 19 are merely examples, and a portfolio manager component may be built with the same, similar, or altogether different functions. In step 1901, the portfolio manager component determines what command the user has designated to be executed. In step 1902, if the command indicates that a new investment object is to be added, then the portfolio manager continues in step 1903, else continues in step 1904. In step 1903, the portfolio manager invokes an Add New Meta-Object routine to add a new meta-object instance that corresponds to the type of investment object desired, and returns to step 1901 to determine and process the next user command. An example Add New Meta-Object routine is discussed further with reference to FIG. 20. In step 1904, if the command indicates that a particular investment object is to be deleted, then the portfolio manager continues in step 1905, else continues in step 1906. In step 1905, the portfolio manager invokes a Delete Meta-Object routine to delete the particular investment instance, and returns to step 1901 to determine and process the next user command. An example Delete Meta-Object routine is discussed further with reference to FIG. 22. In step 1906, if the command indicates that the user desires to move or copy an investment object to a different location in the investment instance hierarchy, then the portfolio manager continues in step 1907, else continues in step 1908. In step 1907, the portfolio manager calls a Move/Copy Meta-Object routine to move or copy the investment object indicated, and returns to step 1901 to determine and process the next user command. An example Move/Copy Meta-Object routine is discussed further with reference to FIG. 21. In step 1908, if the command indicates that an investment object is to be modified, then the routine continues in step 1909, else continues in step 1910. In step 1909, the portfolio manager invokes a Change Meta-Object routine to modify the object instance passing appropriate information, and then returns to step 1901 to determine and process the next user command. An example Change Meta-Object routine is discussed further with reference to FIG. 23. In step 1910, if the command indicates that the user's view is to be changed to a different component of the enterprise portfolio management system, then the portfolio manager continues in step 1911, else returns to step 1901 to determine and process the next user command. In step 1911, the portfolio manager relinquishes control to the indicated component.

Figure 20:
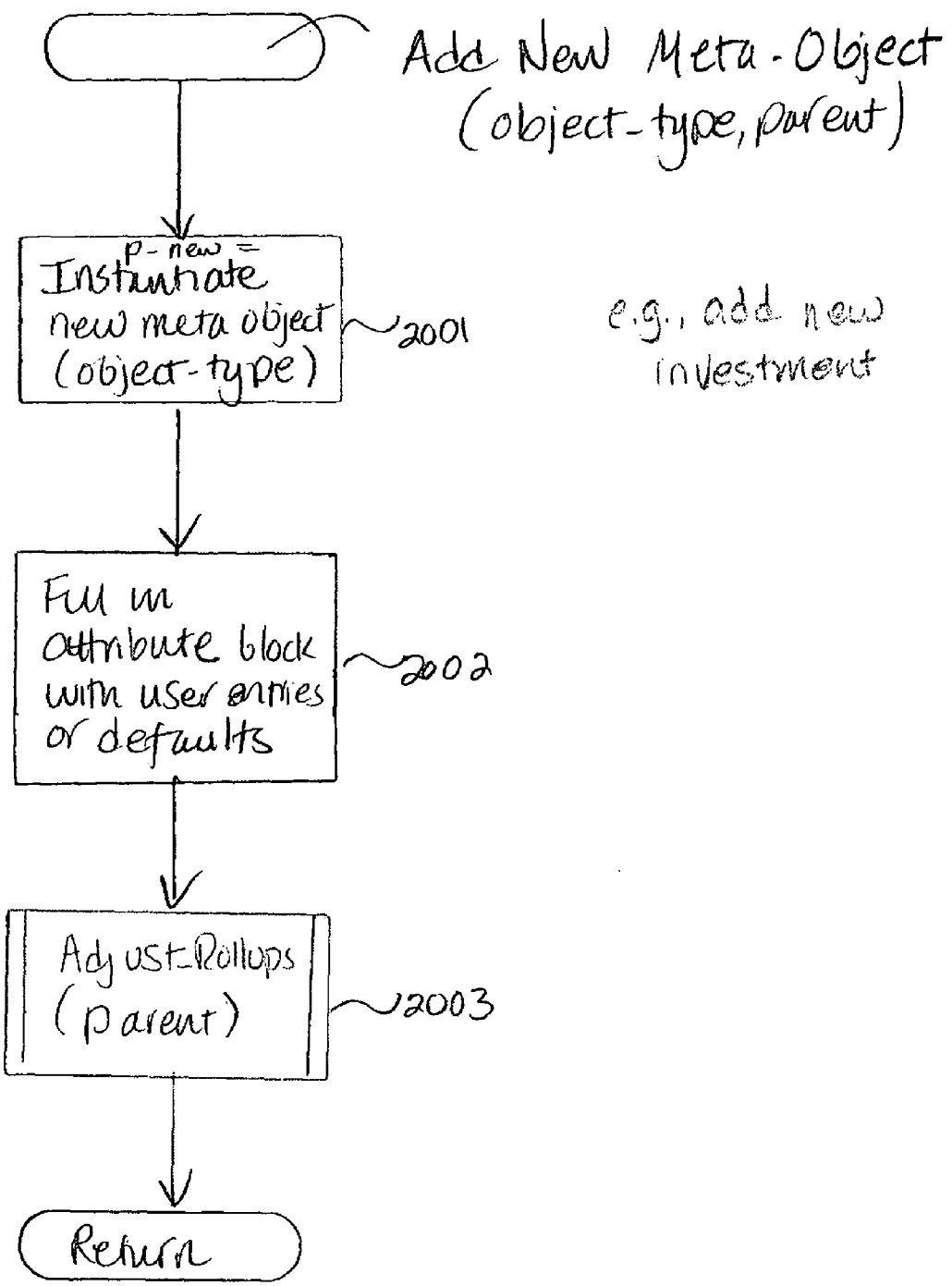
FIG. 20 is an example flow diagram of an Add New Meta-Object routine for adding a new meta-object (investment).

FIG. 20 is an example flow diagram of an Add New Meta-Object routine for adding a new meta-object (investment). The Add New Meta-Object routine is responsible for instantiating and adding a new investment object to a parent node in the investment object hierarchy. The routine takes as input a designated object type and a destination location (new parent object). In step 2001, the routine instantiates a new meta-object to correspond to the investment type. In step 2002, the routine populates the attribute block with user specified values or defaults for unspecified values. In step 2003, the routine invokes the Adjust Rollups routine (previously described with reference to FIG. 11) on the sub-tree of the instance hierarchy whose root is the parent node of the added object. The routine then returns.

Figure 21:
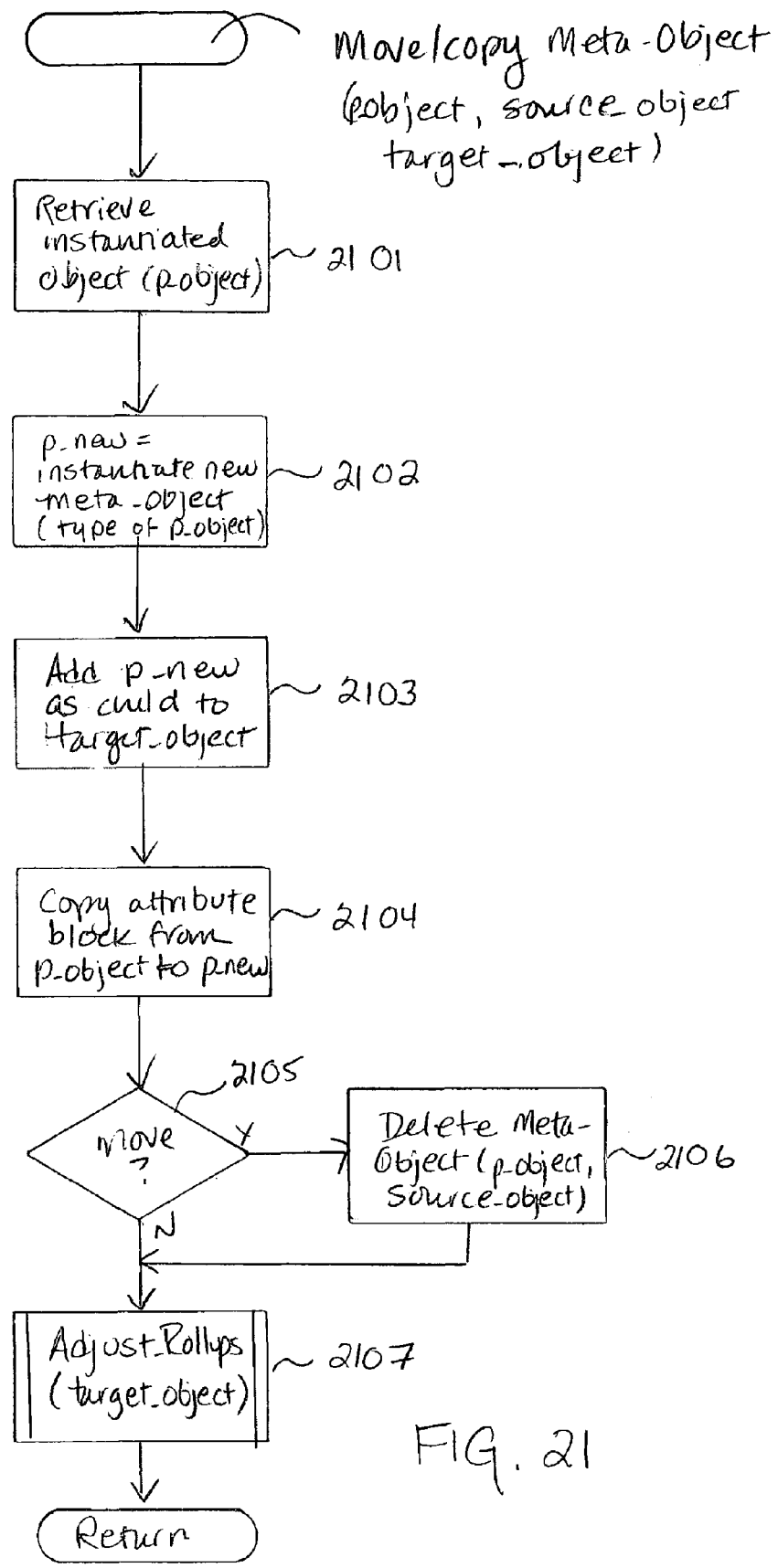
FIG. 21 is an example flow diagram of a Move/Copy Meta-Object routine for moving/copying a new meta-object (investment).

FIG. 21 is an example flow diagram of a Move/Copy Meta-Object routine for moving/copying a new meta-object (investment). The routine takes as input a designated object, a source location (current parent object), and a destination location (new parent object) in the instance hierarchy. In step 2101, the routine retrieves the instantiated object in the instance hierarchy that corresponds to the designated object. In step 2102, the routine instantiates a new object of the same type of object as the designated object. In step 2103, the routine adds the newly instantiated object as a child of the designated new parent object (where the new object is being moved to or copied to). In step 2104, the attribute block, including the values, is copied from the designated object to the new object. In step 2105, if the command has a indicated that a move of the investment object is desired as opposed to a copy of the investment object, then the routine continues in step 2106 to delete the designated object from the current parent, else continues in step 2107. Thus, a move operates similar to a copy except that the original investment object is deleted. In step 2107, the routine invokes the Adjust Rollups routine (previously described with reference to FIG. 11) on the entire instance hierarchy, and returns.

Figure 22:
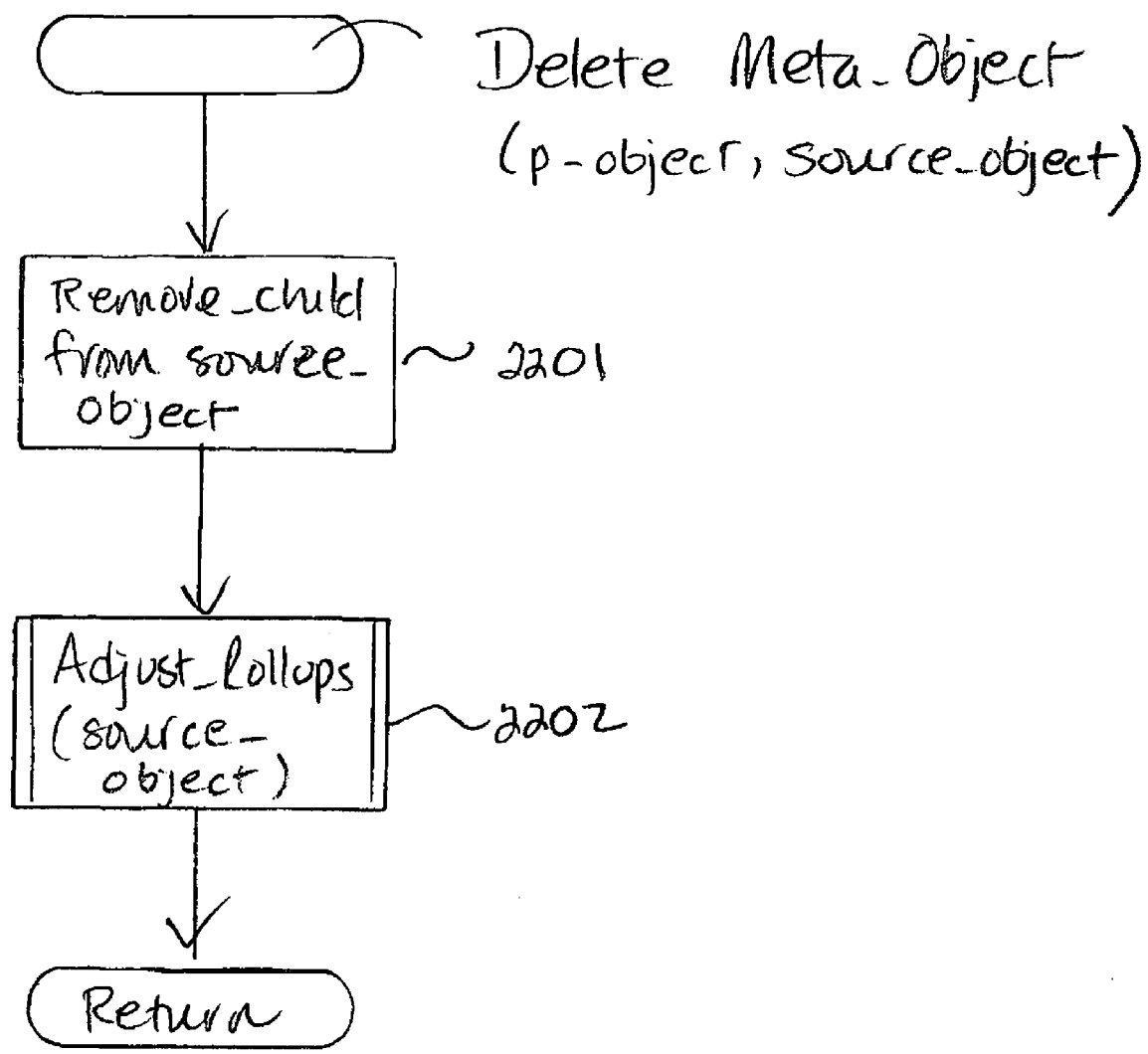
FIG. 22 is an example flow diagram of a Delete Meta-Object routine for deleting a meta-object (investment).

FIG. 22 is an example flow diagram of a Delete Meta-Object routine for deleting a meta-object (investment). The Delete Meta-Object routine takes as input parameters a designated object to be deleted and a source location (current parent object). In step 2201, the routine removes the designated child object from the source location. In step 2202, the routine invokes the Adjust Rollups routine (previously described with reference to FIG. 11) to adjust the rollups on the sub-tree whose root is the source location, since one of its children objects has been deleted. The routine then returns.

Figure 23:
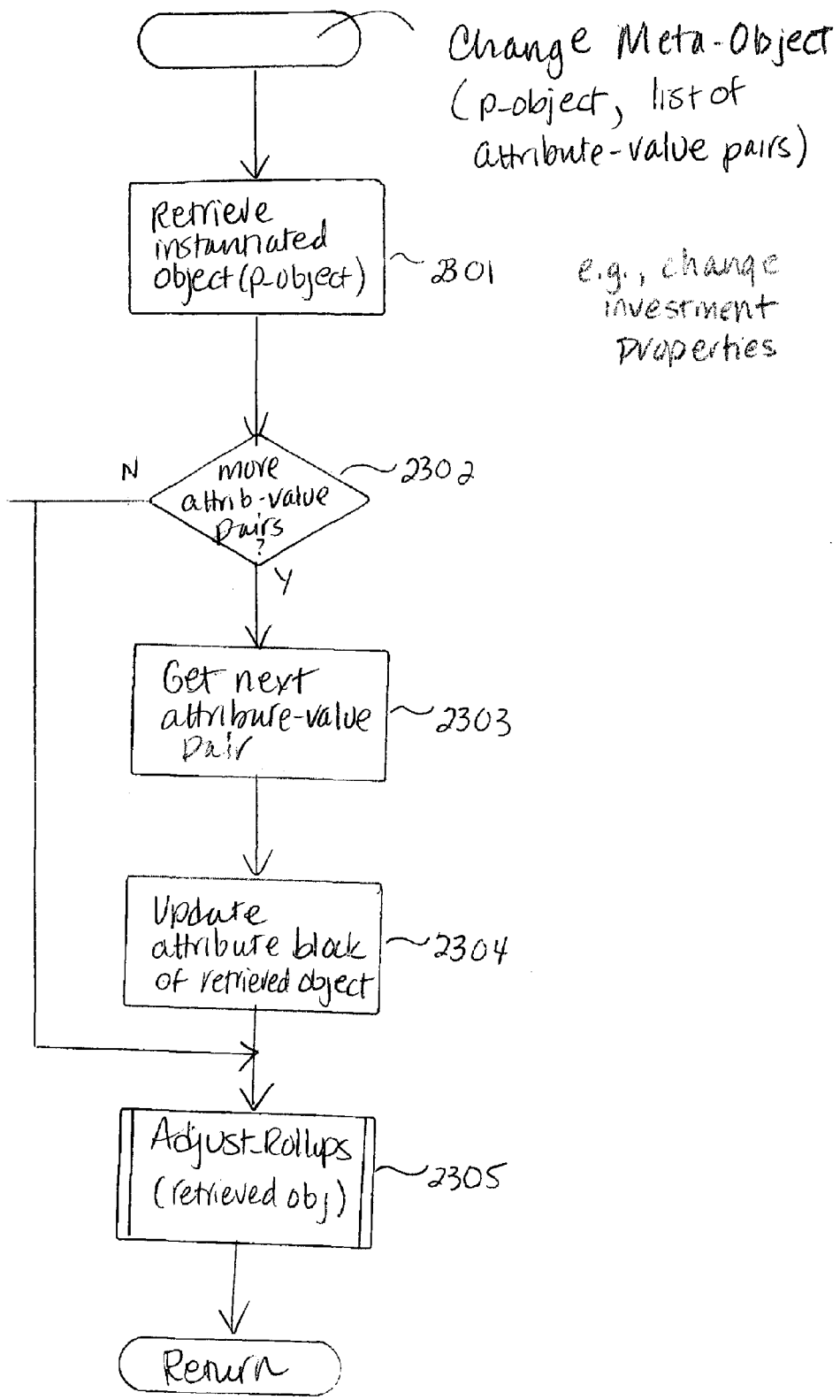
FIG. 23 is an example flow diagram of a Change Meta-Object routine for changing an existing meta-object (investment).

FIG. 23 is an example flow diagram of a Change Meta-Object routine for changing an existing meta-object (investment). The Change Meta-Object routine takes as input a designate object and a list of attribute tag-value pairs that describe values for the attributes of the designated object. This routine is used, for example, to change the properties of a particular investment. In step 2301, the routine retrieves the instantiated object that corresponds to the designated object.

In steps 2302 through 2304, the routine executes a loop for each designated attribute tag-value pair to update the attribute block in the retrieved object. Specifically, in step 2302, the routine determines whether there are more designated attribute tag-value pairs and, if so, continues in step 2303, else continues in step 2305. In step 2303, the routines obtains the next attribute tag-value pair in the designated list. In step 2304, the routine updates the attribute block of the retrieved object with the particular attribute tag designated by the current attribute tag-value pair, and updates the value of that attribute in the attribute block of the retrieved object. In step 2305, the routine invokes the Adjust Rollups routine (previously described with reference to FIG. 11) on the sub-tree whose root is the retrieved object, and returns.

Figure 24:
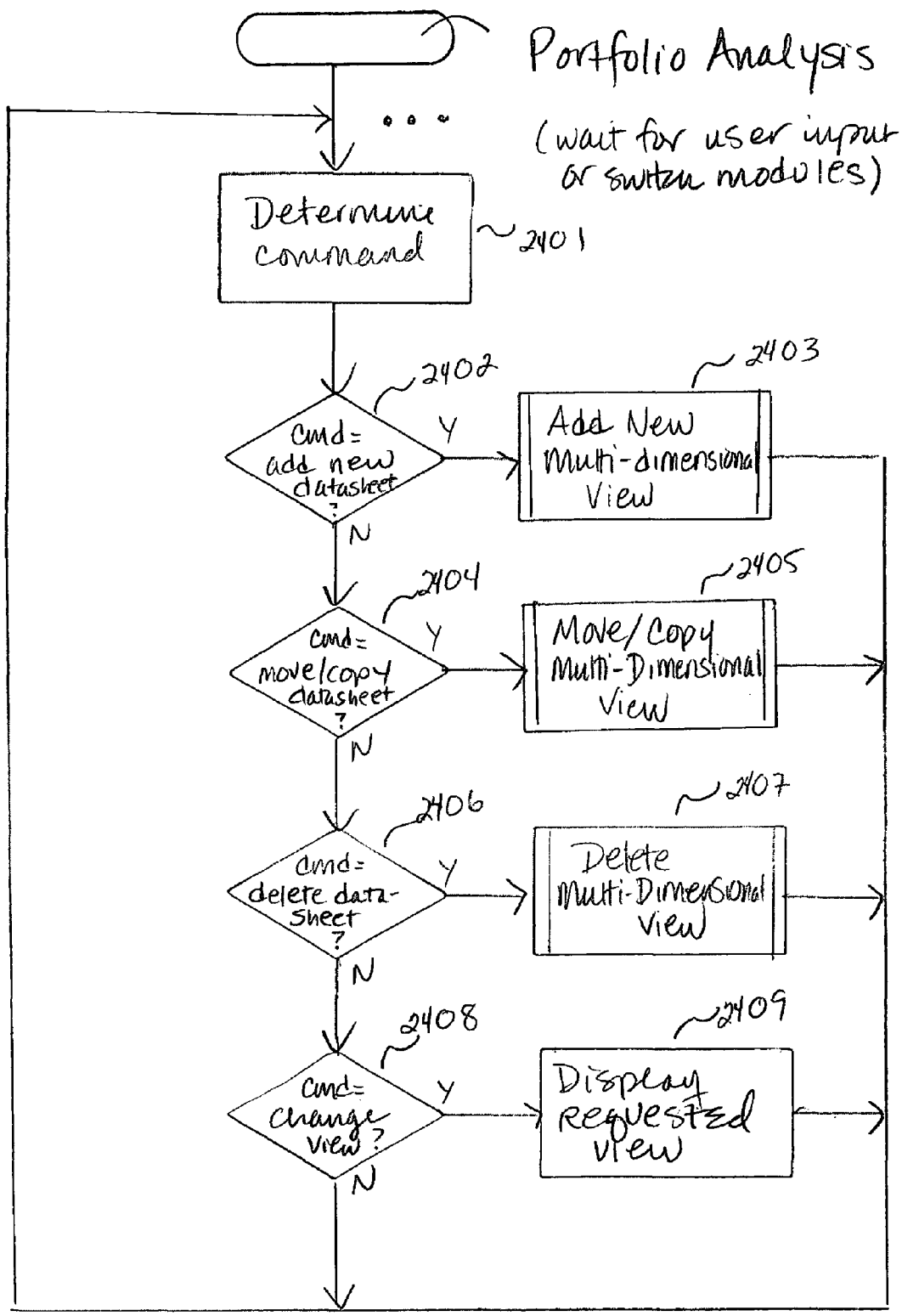
FIG. 24 is an overview flow diagram of example portfolio analysis functions of a portfolio analyzer component of an example Enterprise Portfolio Management System.

FIG. 24 is an overview flow diagram of example portfolio analysis functions of a portfolio analyzer component of an example Enterprise Portfolio Management System. The portfolio analyzer component of an enterprise portfolio management system is responsible for creating and managing multi-dimension views of the meta-object instances and charts that correspond to investment data. One skilled in the art will recognize that the functions displayed in FIG. 24 are merely examples, and a portfolio analyzer component may be built with the same, similar, or altogether different functions. In step 2401, the portfolio analysis component determines the command that was selected by the user as input. In step 2402, if the command indicates that a new datasheet is to be added, then the routine continues in step 2403, else continues in step 2404. In step 2403, the portfolio analyzer component invokes a Create Multi-Dimensional View routine to add a new multi-dimensional view to the enterprise portfolio management system, and then returns to step 2401 to determine and process the next user command. An example Create Multi-Dimensional View routine for adding a new multi-dimensional view is described further with reference to FIG. 25. In step 2404, if the command indicates that the user desires to move or copy a datasheet, then the portfolio analyzer component continues in step 2405, else continues in step 2406. In step 2405, the portfolio analyzer component invokes a Move/Copy Multi-Dimensional View routine to move or copy an existing multi-dimensional view, and then returns to step 2401 to determine and process the next user command. An example Move/Copy Multi-Dimensional View routine is described further with reference to FIG. 27. In step 2406, if the command indicates that a particular datasheet is to be deleted, then the routine continues in step 2407, else continues in step 2408. In step 2407, the portfolio analyzer component invokes a Delete Multi-Dimensional View routine to delete an existing multi-dimensional view, and then returns to step 2401 to determine and process the next user command. An example Delete Multi-Dimensional View routine is described further with reference to FIG. 28. In step 2408, if the command indicates that the user's view is to be changed to a different component of the enterprise portfolio management system, then the portfolio analyzer continues in step 2409, else returns to step 2401 to determine and process the next user command. In step 2409, the portfolio analyzer relinquishes control to the indicated component.

Figure 25:
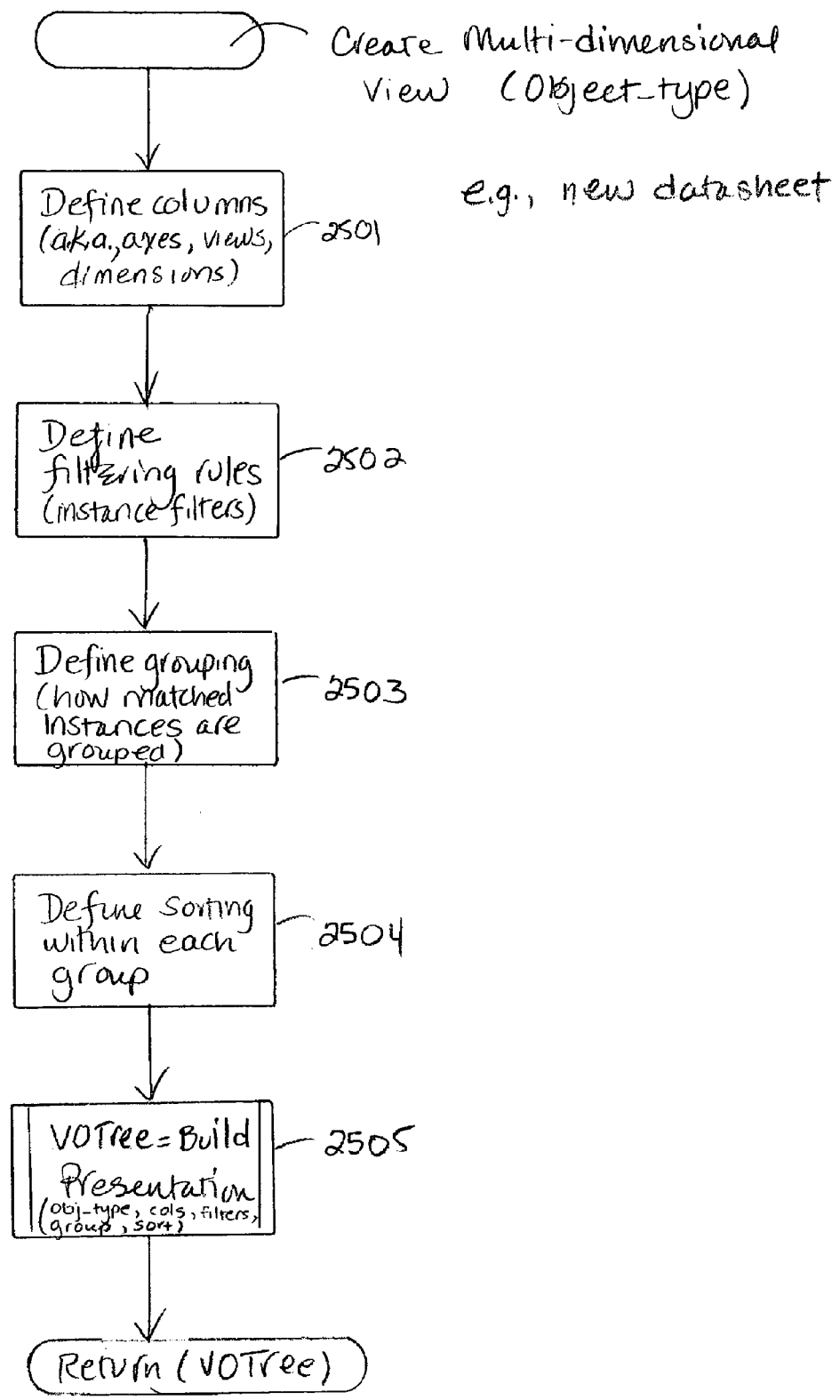
FIG. 25 is an example flow diagram of a Create Multi-Dimensional View routine for creating a multi-dimension view (datasheet) of an example portfolio.

FIG. 25 is an example flow diagram of a Create Multi-Dimensional View routine for creating a multi-dimension view (datasheet) of an example portfolio. As described earlier, new datasheets (also referred to as multi-dimensional views) can be defined for a particular portfolio or other object instance by populating values in a datasheet property sheet using well-known interfaces such as dialog windows or forms. One skilled in the art will also recognize that the equivalent input may be specified in a more "batch" oriented process, so that other code can use the routine to build a datasheet. Specifically, in step 2501, the routine implements a mechanism to define the various columns for the new datasheet view. In some environments, "columns" are also known as axes, views, dimensions, or by similar terminology. In step 2502, the routine implements a mechanism to define filtering rules. These rules are used filter out instances that do not match the specified rule or that match the specified rule, however indicated. In step 2503, the routine implements an interface to define how instances that match the column specification and filtering rules are to be grouped in the resultant datasheet. In step 2504, the routine implements an interface to define the particular sorting algorithm to be used to order matching instances within each grouping. In step 2505, the routine invokes a Build Presentation routine to build a presentation that corresponds to the new datasheet properties defined in steps 2501-2504. This presentation is referred to herein as a "virtual object tree" since objects are temporarily instantiated that correspond to the datasheet, which are not stored in the actual hierarchy or using persistent storage. An example Build Presentation routine is described further with reference to FIG. 26.

Figure 26:
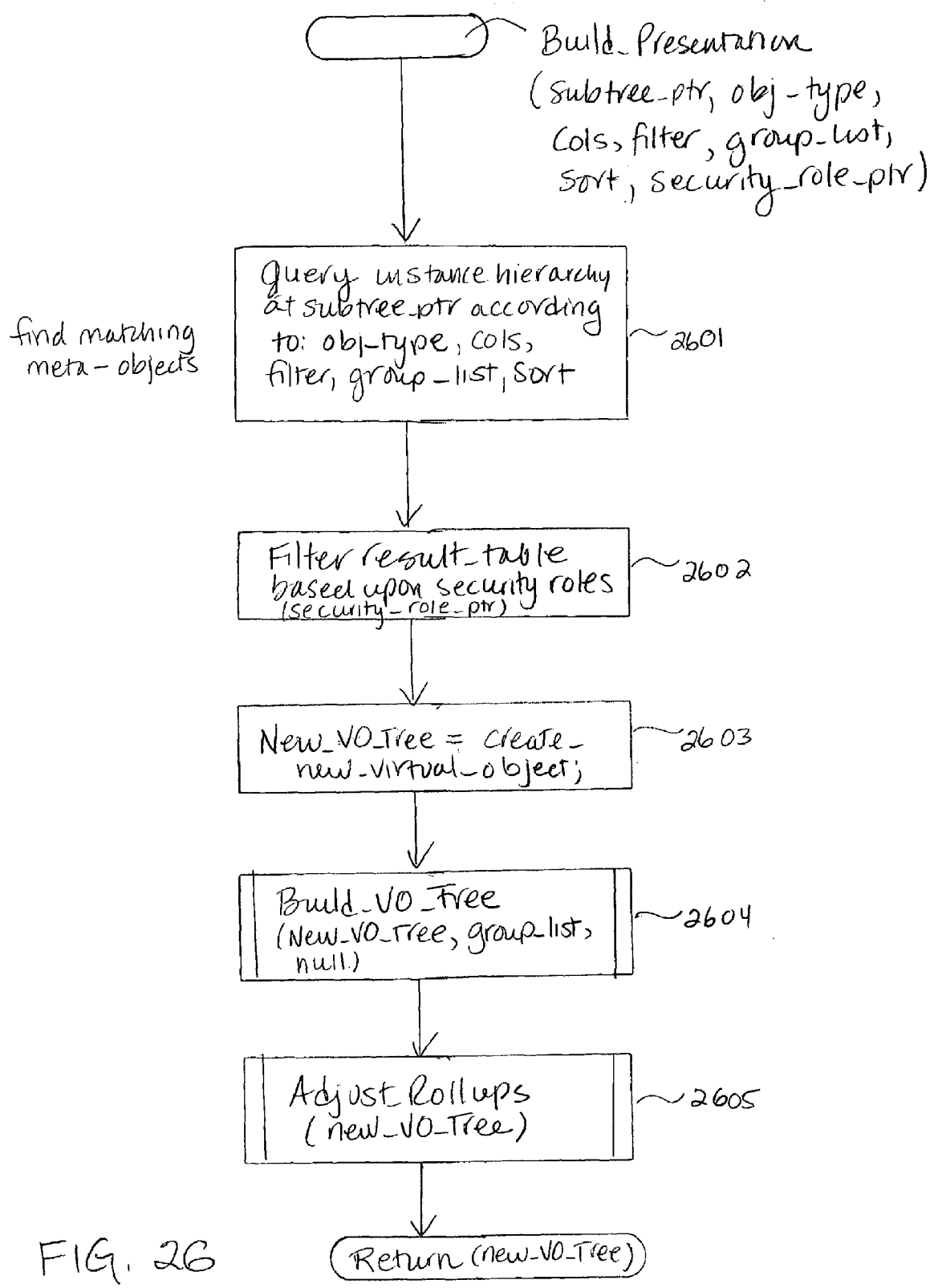
FIG. 26 is an example flow diagram of a Build Presentation routine for building a presentation for a multi-dimension view.

FIG. 26 is an example flow diagram of a Build Presentation routine for building a presentation for a multi-dimension view. The routine takes as input a indicator of a sub-tree in the instance hierarchy (typically a portfolio node) and other attributes specified by the datasheet attribute specification, such as an object type, list of relevant columns, filter definition, grouping list, sorting list, and a indication of an applicable security role. In summary, the build presentation routine queries the investment object instance hierarchy to determine all of the investment objects that match the attribute specification of the datasheet and builds a virtual object tree that corresponds to the matching instances. In essence, a virtual object is a temporary object instance that is used to group the real investment object instances based upon the groups indicated in the attribute specification. That is, since an instance does not exist that directly corresponds to the "group" itself and a grouping is a mere abstraction, in order for all of the rollup functions etc. to work properly, a virtual object needs to be created to correspond to each matching group, as if the group were an entity. The virtual objects look and behave like other investment objects to a user; however they live for the life of the datasheet, and are instantiated when needed to present the datasheet. Once the virtual object tree is created, then rollups are adjusted appropriately. One skilled in the art will recognize that there are other ways to implement a datasheet, and that FIG. 26 and Table 1 correspond to one of these implementation approaches.

Specifically, in step 2601, the routine queries the investment object instance hierarchy at the designated sub-tree according to the designated parameters specified in the datasheet attribute specification (see input parameter list) to determine a results table. Specifically, the query locates objects of the designated object type that have the designated columns and that correspond to the grouping, filtering, and sorting rules previously indicated and designated as input parameters. The designated group list is a list of each grouping of matching instances. For example, investments may be grouped by "rank" and then by geographic region. Once grouped, then the designating sorting rules are used to order matching instances within a group (the results of the query). Appendix A shows examples of resultant datasheets with attribute specifications having multiple groups and sorting rules.

In step 2602, the routine filters the resulting table of instances based upon the security roles that are indicated by the designated security roles. For example, different security roles can be defined for different users and organziational groupings, etc., and the roles can be used to filter the data users have access to and what types of investment data can be viewed via the datasheets. Different security roles may be defined that correspond to modification access permissions as well as what data may be viewable. The security roles may directly correlate to the organizational hierarchy, which may also be reflected in the actual containment hierarchy of the investment instances.

In step 2603, a new virtual object tree root node (a virtual object) is created. In step 2604, a Build_VO_Tree routine is invoked to build a virtual object tree from the resultant table of instances that was returned as a result of the query. The pseudo code for an example Build_VO_Tree routine is described further with reference to Table 1. In step 2605, the routine invokes the Adjust Rollups routine described with reference to FIG. 11 on the newly created virtual object tree so that rollups can be properly computed for the datasheet. The routine then returns the instantiated virtual object tree, which corresponds to the datasheet.

TABLE 1

```
1   Build_VO_Tree (root, group_list, query_string) {
2
3           curr_group = head (group_list);
4           new_grp_list = rest (group_list);
5           # for each value in current group, starting with the first, ending with the last
6           for value = first_value (curr_group), next (curr_group, last_value (curr_group) {
7
8                   subroot = create_new_virtual_object;
9
10                  if (new_grp_list = null) {
11                          # find all data that matches current sent of group values
12                          leaf_table = query_results_table (concat (query_string,
13                                                                        curr_group, value));
14                          for row in leaf_table {
15                                  # add pointers from subroot to all data that matches
16                                  add_row_as_child (subroot, row);
17                                  # update subroot attributes based on row data
18                                  update_subroot_attributes (subroot, row);
19                          };
20                          if (result != 0) {
21                                  # integrate new leaf node (virtual object) into VO tree
22                                  add_child (root, subroot);
23                                  # update root attributes based upon those of new VO
24                                  update_root_attributes (root, subroot);
25                          } # no data exists with current group value
26                          else delete (subroot);
27                  }
28                  else{
29                          # recurse to build a child sub-tree with current group = value
30                          child = Build_VO_Tree (subroot, new_grp_list,
31                                                      concat (query_string, curr_group, value));
32                          # add the newly built child into the current sub-tree
33                          add_child (root, child);
34                          # update root attributes based upon those of child
35                          update_root_attributes (root, child);
36                  };
37          }; # end loop on current group values
38
39          return (root);
40  }
```

Table 1 contains pseudo code for an example Build_VO_Tree routine. As illustrated, the Build_VO_Tree routine implements a recursive process for building up a virtual object tree from the results of a query of the investment instance hierarchy based up a datasheet attribute specification. It is assumed that the results of the query are in tabular form, or otherwise easily decomposed, and that the results are grouped and sorted in the order that they should be displayed. One skilled in the art will recognize that this is not a requirement and that the pseudo code for the Build_VO_Tree routine could be modified appropriately. Also, iterative equivalents of the recursive process could be equivalently substituted.

In summary, the routine builds a virtual object tree whose leaf nodes point to investment data. The routine operates from the "inside" out (leaf nodes up). That is, the datasheet is effectively a tree turned sideways, where the innermost groupings are the leaf nodes, the investment data that matches the innermost grouping are indicated in these leaf nodes, and the next level of grouping is the next "level" of intermediate virtual object nodes in the tree, and so forth. Virtual objects need to be created for each intermediate (group) node in the tree, since instantiated objects exist only for investment data. Thus, examining a datasheet excerpt shown in a Summary View of the Portfolio Analyzer display screens in Appendix A, a subset of which is also displayed in Table 2 below, the investment data results are grouped first by Region values and grouped second by Score values. Under each combination of Region/Score values, there are 0 to N investment objects instances with those values. There are M levels of virtual objects for each M levels of groups. Thus, a virtual object is preferably created for each grouping (combination) value, with indicators to the instantiated investments, and a virtual object is needed for each discrete value (or combined value) of each group of groups, and so on.

TABLE 2

| Name | Budget | Region | Score | Status | Total Cost |
|---|---|---|---|---|---|
| Region:2 | $81,000 | 2 | | | $72,000 |
| Score:2 | $27,000 | | 2 | | $24,000 |
| Project 3 | $13,000 | 2 | 2 | Green | $12,000 |
| Project 2 | $9,000 | 2 | 2 | Red | $8,000 |
| Project 1 | $5,000 | 2 | 2 | Green | $4,000 |
| Score:3 | $26,000 | | 3 | | $23,000 |
| Project A | $11,000 | 2 | 3 | Yellow | $10,000 |
| Project 4 | $8,000 | 2 | 3 | Green | $7,000 |
| Region:1 | | 1 | | | |
| Score:1 | | | 1 | | |
| ... | | 1 | 1 | | |
| Score:3 | | | 3 | | |

For example, looking at Table 2, a virtual object is created for a [region=2; score=2] leaf node; a [region=2; score=3] leaf node; a [region=1; score=1] leaf node; and a [region=1; score=3] leaf node. Each of these become children of an "intermediate" virtual object node, in this case, on the outermost grouping level: a virtual object is created for a [region=2] node and a virtual object is created for a [region=1] node, and so on. Thus, the resulting virtual object tree has 2 levels (since there are 2 levels of groups) with a topmost root, the first level corresponding to region values, and the second level corresponding to score/region values.

The pseudo code of Table 1 demonstrates an implementation of this approach. The loop of lines 6-37, examines each value of a current group. If the innermost group (leaf nodes) has not yet been reached, then the routine is invoked recursively in line 30 to build a virtual object tree starting with a newly created virtual object sub-tree and the rest of the group list. This process continues until the innermost group is reached, in which case line 10 is true. At that point, all of the matching investment instances for that combination of group values is determined (line 12), each matching instances is added to the virtual object leaf node (line 16), and the attributes of the virtual object leaf node are determined (line 18). Once all of the matching instances have been referenced by the virtual object leaf node (line 20), then the newly created leaf node is added into the virtual object sub-tree whose root is the next closest intermediate node (the parent virtual object of the leaf node) (line 22). The attribute values of the current root (the parent virtual object) are then updated based upon the attributes of the newly created virtual object leaf node (line 24). When the current invocation of the routine then pops back up to a prior recursive invocation (line 30 results), then the newly build virtual object sub-tree is added a child node to the current root of that sub-tree (line 33). The attributes of the current root are then updated to reflect the built sub-tree (line 35). In the example shown in Table 2, the current root at that point is the root of the datasheet—the entire virtual object tree. One skilled in the art will recognize that other implementations, such as those that actually persist the virtual objects that correspond to a datasheet are also feasible.

Figure 27:
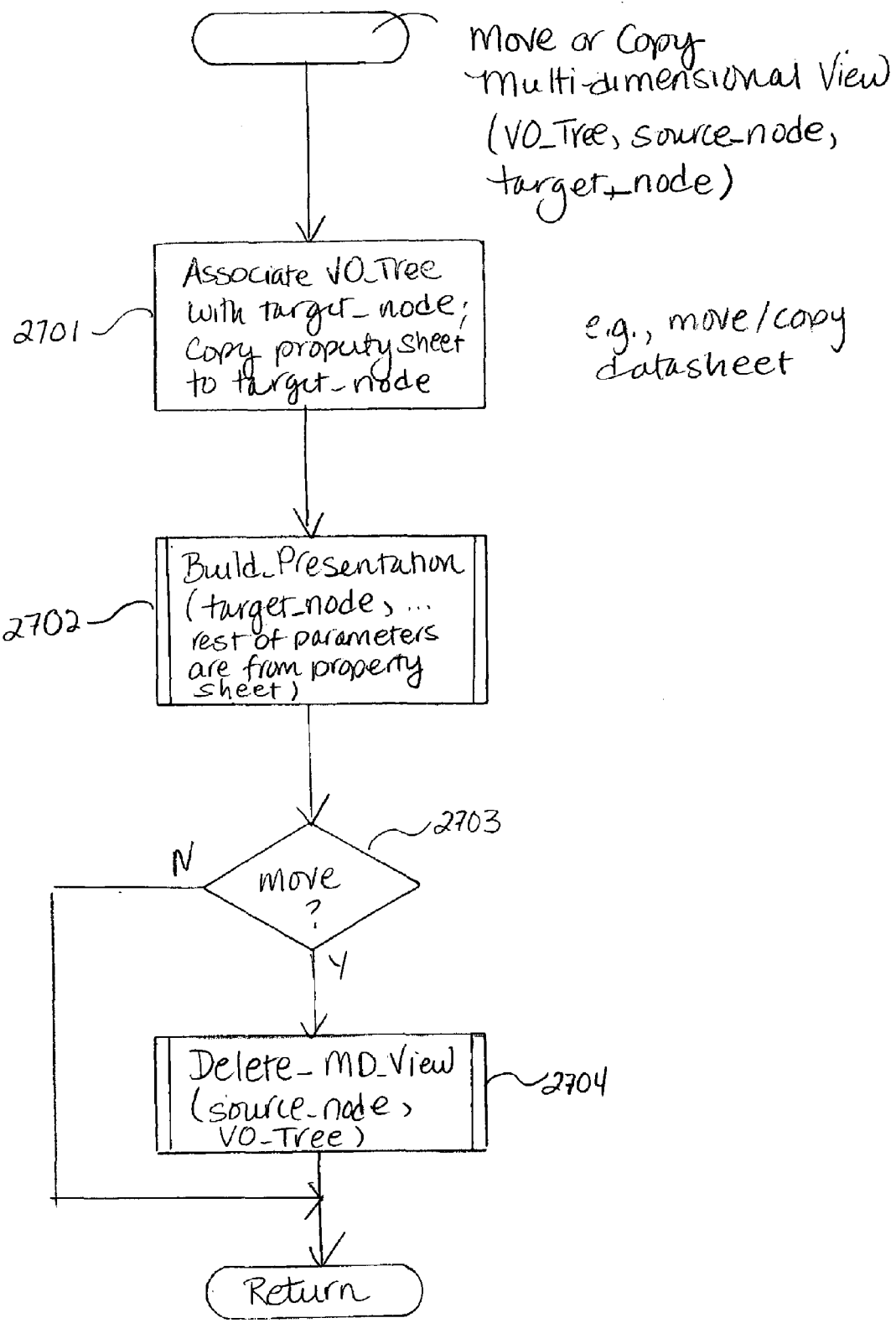
FIG. 27 is an example flow diagram of a Move/Copy Multi-Dimensional View routine for moving/copying a multi-dimension view.

As described earlier with respect to FIG. 24, once a datasheet is created, it can be moved or copied to another investment object. In one embodiment, datasheets are associated with portfolio objects only; however, one skilled in the art will recognize that it is possible to associate datasheets with other investment objects as well. FIG. 27 is an example flow diagram of a Move/Copy Multi-Dimensional View routine for moving/copying a multi-dimension view. The routine takes as input a virtual object tree, an indication of a source node, and an indication of a target (destination) node. Note that, if more than one datasheet can be associated with a node, then an indication of which datasheet is also an input parameter. In step 2701, the designated virtual object tree is associated with the designated target node so that the datasheet will become part of that investment object. The property sheet that defines the datasheet is also copied as appropriate to the properties of the designated target node so that the target node then has access to maintain the datasheet. In step 2702, the routine invokes the Build Presentation routine described with reference to FIG. 26 so that a new virtual object tree that corresponds to the moved datasheet can be created for the target node. This step is necessary since the values of the datasheet typically depend upon the sub-tree of nodes associated with the datasheet. In step 2703, if the portfolio analyzer interface has specified that the datasheet is to be moved, then the routine continues in step 2704, otherwise returns. In step 2704, the routine calls a Delete Multi-Dimensional View routine to delete the datasheet associated with the designated source node, and then returns.

Figure 28:
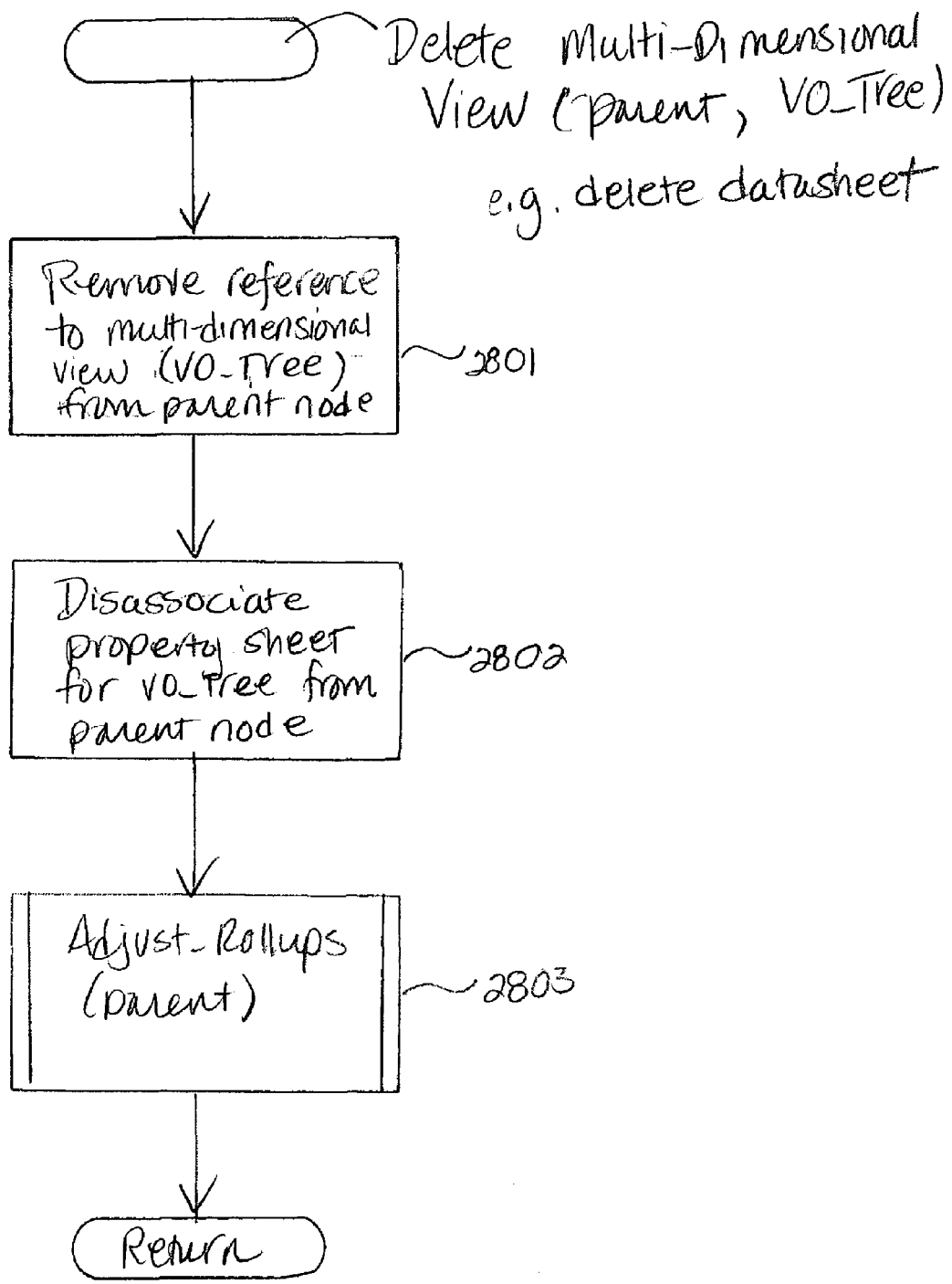
FIG. 28 is an example flow diagram of a Delete Multi-Dimensional View routine for deleting a multi-dimension view.

FIG. 28 is an example flow diagram of a Delete Multi-Dimensional View routine for deleting a multi-dimension view. This routine allows a user to delete an existing datasheet. The routine takes as input an indication of the parent (portfolio) node where the datasheet is to be deleted from, and an indicator to the virtual object tree. In cases where more than one datasheet is supported, an indicator to the datasheet is included as a parameter. In step 2801, the reference to the datasheet that is specified by the virtual object tree is removed from the designated parent node. In step 2802, the property sheet is disassociated from the parent node that corresponds to the designated virtual object tree. In step 2803, the routine then invokes the Adjust Rollups routine described with reference to FIG. 11 to recalculate the rollups on the sub-tree indicated by the parent node, in case values have been modified. The routine then returns.

In addition to creating and managing datasheets, the example portfolio analyzer also supports dynamic charting capabilities. Appendix C shows detailed display screens for a charting sequence from a charting subsystem of an example enterprise portfolio management system. A chart "vector," which defines all of the potential axes for a particular set of charts is associated with a datasheet. The axes thus preferably correspond to all of the dimensions viewable in the datasheet. Once a chart vector is created for a particular chart type (e.g., a bubble chart), the axes that correspond to the currently displayed presentation are dynamically selectable. Thus, the charts can redisplay the underlying datasheet investment data, without having to be rebuild the chart structure.

All of the above U.S. patents, U.S. patent application publications, U.S. patent applications, foreign patents, foreign patent applications and non-patent publications referred to in this specification and/or listed in the Application Data Sheet, including but not limited to U.S. Provisional Patent Application No. 60/471,811, entitled "METHOD AND SYSTEM FOR OBJECT-ORIENTED MANAGEMENT OF MULTI-DIMENSIONAL DATA," filed May 19, 2003, is incorporated herein by reference, in its entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems for creating, managing, and analyzing heterogeneous investment data discussed herein are applicable to other types of data management systems other than enterprise portfolio management. For example, the techniques used herein can be applied to homogeneous data such as streamlined inventory control systems or project management systems. One skilled in the art will also recognize that the methods and systems discussed herein are applicable to differing network protocols other than the Internet and web-based communication, communication media (optical, wireless, cable, etc.) and devices (such as wireless handsets, electronic organizers, personal digital assistants, portable email machines, game machines, pagers, navigation devices such as GPS receivers, etc.).

The invention claimed is:

1. A computer system for managing and analyzing enterprise portfolio data, comprising:
    a memory;
    a portfolio representation structure instantiated and stored in the memory as an object instance hierarchy that contains enterprise portfolio data from different types of investments, the enterprise portfolio data including financial investments and non-financial investments;
    a portfolio manager component that is stored in the memory and that is configured, when executed, to add, to the portfolio representation structure, items that correspond to transactions on the enterprise portfolio data; and
    a portfolio analyzer component that is stored in the memory and that is configured, when executed, to present a plurality of views of the enterprise portfolio data as represented by the portfolio representation structure, wherein the views dynamically calculate and present multi-dimensional characterizations of the enterprise portfolio data while items are added using the portfolio manager, thereby concurrently providing online transaction processing that may affect relationships among the enterprise portfolio data while supporting online analysis of the presented views of the enterprise portfolio data.

2. The system of claim 1 wherein the portfolio data is from heterogeneous data sources that store data in a plurality of formats.

3. The system of claim 1 wherein the portfolio data represents investments from distinctive parts of an organization.

4. The system of claim 3 wherein the organization parts include at least two of management, marketing, sales, product management, manufacturing, research, development, IT, finance, operations, consulting, engineering, and human resources.

5. The system of claim 1 wherein the portfolio data includes project management characterizations.

6. The system of claim 1 wherein the plurality of views includes at least one dimensioned attribute.

7. The system of claim 6 wherein the dimensioned attribute includes at least two of actual value, baseline value, plan value, target value, and scenario value.

8. The system of claim 1, further comprising:
    a meta-object data management system for managing the portfolio representation structure.

9. The system of claim 8 wherein the structure is hierarchical.

10. A method in a computer system for representing, managing, and analyzing investments of an organization, the computer system having a computer processor and a memory, the method comprising:
    under control of the computer processor of the computer system,
        instantiating a hierarchy of object instances, each object instance representing an investment of the organization, wherein at least two object instances represent data from categories of investments that are different from each other such that data from at least a first investment type and data from at least a second investment type, the first investment type different from the second investment type, are contained as different object instances in the same object instance hierarchy;
        receiving a request to display data from a plurality of the object instances according to an attribute specification;
        displaying the object instances of the plurality of object instances that match the attribute specification, in a manner that is in accordance with the attribute specification, so that multi-dimensional views of the matching objects are computed and displayed dynamically; and
        processing changes to the hierarchy of object instances while displaying the object instances that match the attribute specification, thereby concurrently allowing online transaction processing that may affect the hierarchy of object instances while supporting online analysis of the displayed object instances.

11. The method of claim 10 wherein the request to display data according to an attribute specification is received as properties of a datasheet associated with an object instance in the hierarchy.

12. The method of claim 10, each object instance having constituent attributes with associated values, wherein the displaying of the object instances that match the attribute specification further comprises:
    determining from each matching object instance the constituent attributes and associated values;

dynamically constructing a virtual object instance to represent each aggregation of matching objects that is not already an instantiated object; and displaying the constructed virtual objects along with the matching object instances.

13. The method of claim 12 wherein each virtual object instance automatically aggregates appropriate attributes of children object instances and children virtual object instances.

14. The method of claim 13 wherein at least one of the aggregated attributes represents time-phased data values.

15. The method of claim 13 wherein the attributes of the children instances specify whether they are to be aggregated to a parent virtual object instance.

16. The method of claim 12 wherein a value associated with at least one attribute is a dimensioned value.

17. The method of claim 16 wherein the dimensioned value comprises at least two of actual value, baseline value, plan value, target value, and scenario value.

18. The method of claim 10 further comprising defining, based on a datasheet, a dynamically created multi-dimensional view of the instantiated object hierarchy that is not previously stored in the computer system.

19. The method of claim 10 wherein the hierarchy of object instances includes one or more parent object instances each having one or more child object instances, wherein each child object instance of a parent object instance represents a relationship whereby the investment represented by the parent object instance is an aggregation of the child object instances associated with the parent object instance.

20. The method of claim 10 wherein the investments are part of an enterprise portfolio management system.

21. The method of claim 20 wherein the investments comprise heterogeneous data types in the form of at least two of financial investments, project management, collections of projects, programs, assets, human resources, products, portfolios, initiatives, applications, operations, processes, and activities.

22. The method of claim 20, the enterprise portfolio management system managing enterprise portfolios, wherein the enterprise portfolios comprise at least two of engineering, marketing, product management, manufacturing, sales, information technology, finance, human resources, research, development, and professional services portfolios.

23. The method of claim 10 wherein the investments include time-phased data.

24. The method of claim 23 wherein the time-phased data is stored in a manner that indicates a first designated time period in a virtual object instance and is stored in a manner that indicates a second designated time period in the object instances that are children of the virtual object instance that stores the time-phased data.

25. The method of claim 24 wherein the first designated time period is at least one of weekly, monthly, quarterly, and annually.

26. The method of claim 24 wherein the second designated time period is at least one of daily and hourly.

27. The method of claim 24 wherein the second designated time period is a custom defined range.

28. The method of claim 24 wherein the first designated time period is a custom defined range.

29. The method of claim 23 wherein a change to time-phased data of a virtual object instance is automatically reflected in changes to object instances that are children of the virtual object instance in which the change occurred.

30. The method of claim 10 wherein the object instances of the plurality that match the attribute specification is filtered based upon a security role associated with the request.

31. The method of claim 10, further comprising:
indicating that the request to display data according to the attribute specification is to be applied to a different plurality of object instances of the hierarchy; and
automatically modifying the display of the object instances to include object instances from the different plurality that match the attribute specification.

32. The method of claim 31 wherein the indication is to copy the request and the display of object instances includes the object instances from the plurality that match the attribute specification in addition to objects instances from the different plurality.

33. The method of claim 31 wherein the indication is to move the request and the object instances from the plurality that match the attribute specification are removed from the display unless the object instances from the plurality that match are also instances of the different plurality.

34. The method of claim 10, each object instance having constituent attributes with associated values, further comprising:
associating a chart definition with the request to display data according to the attribute specification, the chart definition having an associated set of chart parameters; and
automatically determining values for the associated chart parameters based upon the constituent attributes of the object instances that match the attribute specification.

35. The method of claim 34, further comprising:
presenting a chart that corresponds to the chart definition, such that the values displayed by the chart are automatically determined from the values associated with the constituent attributes of the object instances that match the attribute specification.

36. The method of claim 34, further comprising:
associating the chart definition with a request to display data from a different plurality of object instances according to a second attribute specification; and
automatically re-determining the values for the associated chart parameters based upon the constituent attributes of the object instances from the different plurality that match the second attribute specification.

37. The method of claim 36 wherein the second attribute specification is the same as the attribute specification.

38. The method of claim 36 wherein the chart definition is moved.

39. The method of claim 36 wherein the chart definition is copied.

40. A computer-readable memory medium containing instructions for controlling a computer system to represent, manage, and analyze investments of an organization, by performing:
instantiating a hierarchy of object instances, each object instance representing an investment of the organization, wherein at least two object instances represent data from types of investments that are different from each other such that data from at least a first investment type and data from at least a second investment type, the first investment type different from the second investment type, are contained as different object instances in the same object instance hierarchy;
receiving a request to display data from a plurality of the object instances according to an attribute specification;
displaying the object instances of the plurality of object instances that match the attribute specification, in a manner that is in accordance with the attribute specification, so that multi-dimensional views of the matching objects are computed and displayed dynamically; and processing changes to the hierarchy of object instances while displaying the object instances that match the attribute specification, thereby concurrently allowing online transaction processing that may affect the hierarchy of object instances while supporting online analysis of the displayed object instances.

41. The memory medium of claim 40 wherein the request to display data according to an attribute specification is received as properties of a datasheet associated with an object instance in the hierarchy.

42. The memory medium of claim 40, each object instance having constituent attributes with associated values, wherein the displaying of the object instances that match the attribute specification further comprises:
   determining from each matching object instance the constituent attributes and associated values;
   dynamically constructing a virtual object instance to represent each aggregation of matching objects that is not already an instantiated object; and
   displaying the constructed virtual objects along with the matching object instances.

43. The memory medium of claim 42 wherein each virtual object instance automatically aggregates appropriate attributes of children object instances and children virtual object instances.

44. The memory medium of claim 43 wherein at least one of the aggregated attributes represents time-phased data values.

45. The memory medium of claim 42 wherein a value associated with at least one attribute is a dimensioned value.

46. The memory medium of claim 45 wherein the dimensioned value comprises at least two of actual value, baseline value, plan value, target value, and scenario value.

47. The memory medium of claim 40 further comprising instructions that control the processor by: defining, based on a datasheet, a dynamically created multi-dimensional view of the instantiated object hierarchy that is not previously stored in the computer system.

48. The memory medium of claim 40 wherein the hierarchy of object instances includes one or more parent object instances each having one or more child object instances, wherein each child object instance of a parent object instance represents a relationship whereby the investment represented by the parent object instance is an aggregation of the child object instances associated with the parent object instance.

49. The memory medium of claim 40 wherein the investments are part of an enterprise portfolio management system.

50. The memory medium of claim 40 wherein the investments include time-phased data.

51. The memory medium of claim 50 wherein the time-phased data is stored in a manner that indicates a first designated time period in a virtual object instance and is stored in a manner that indicates a second designated time period in the object instances that are children of the virtual object instance that stores the time-phased data.

52. The memory medium of claim 50 wherein a change to time-phased data of a virtual object instance is automatically reflected in changes to object instances that are children of the virtual object instance in which the change occurred.

53. The memory medium of claim 40 wherein the object instances of the plurality that match the attribute specification is filtered based upon a security role associated with the request.

54. The memory medium of claim 40, further comprising instructions that control the computer processor by:
   indicating that the request to display data according to the attribute specification is to be applied to a different plurality of object instances of the hierarchy; and
   automatically modifying the display of the object instances to include object instances from the different plurality that match the attribute specification.

55. The memory medium of claim 40, each object instance having constituent attributes with associated values, further comprising instructions that control the computer processor by:
   associating a chart definition with the request to display data according to the attribute specification, the chart definition having an associated set of chart parameters; and
   automatically determining values for the associated chart parameters based upon the constituent attributes of the object instances that match the attribute specification.

56. The memory medium of claim 55, further comprising instructions that control the computer processor by
   presenting a chart that corresponds to the chart definition, such that the values displayed by the chart are automatically determined from the values associated with the constituent attributes of the object instances that match the attribute specification.

57. The memory medium of claim 55, further comprising instructions that control the computer processor by:
   associating the chart definition with a request to display data from a different plurality of object instances according to a second attribute specification; and
   automatically re-determining the values for the associated chart parameters based upon the constituent attributes of the object instances from the different plurality that match the second attribute specification.

58. A portfolio management system for representing, managing, and analyzing investments of an organization, comprising:
   a memory;
   a portfolio management component that is stored in the memory and that is configured, when executed, to instantiate a hierarchy of object instances according to received data, each object instance representing an investment of the organization, wherein at least two object instances represent data from types of investments that are different from each other such that the data from the different investment types are contained as different object instances in the same object instance hierarchy; and
   a portfolio analysis component that is stored in the memory and that is configured, when executed, to:
      receive a request to display data from a plurality of the object instances according to an attribute specification;
      display the object instances of the of the plurality of object instances that match the attribute specification in a manner that is in accordance with the attribute specification, so that multi-dimensional views of the matching objects are computed and displayed dynamically; and
      process changes to the hierarchy of object instances while displaying the object instances that match the attribute specification, thereby concurrently allowing online transaction processing that may affect the hierarchy of object instances while supporting online analysis of the displayed object instances.

59. The system of claim 58 wherein the request to display data according to an attribute specification is received as properties of a datasheet associated with an object instance in the hierarchy.

60. The system of claim 58, each object instance having constituent attributes with associated values, wherein the portfolio analysis component is further structured, when executed, to display of the object instances that match the attribute specification by:
- determining from each matching object instance the constituent attributes and associated values;
- dynamically constructing a virtual object instance to represent each aggregation of matching objects that is not already an instantiated object; and
- displaying the constructed virtual objects along with the matching object instances.

61. The system of claim 60 wherein each virtual object instance automatically aggregates appropriate attributes of children object instances and children virtual object instances.

62. The system of claim 61 wherein at least one of the aggregated attributes represents time-phased data values.

63. The system of claim 60 wherein a value associated with at least one attribute is a dimensioned value.

64. The system of claim 63 wherein the dimensioned value comprises at least two of actual value, baseline value, plan value, target value, and scenario value.

65. The system of claim 58 wherein the portfolio analysis component is further structured, when executed, to: define, based on a datasheet, a dynamically created multi-dimensional view of the instantiated object hierarchy that is not previously stored in the computer system.

66. The system of claim 58 wherein the hierarchy of object instances includes on or more parent object instances each having one or more child object instances, wherein each child object instance of a parent object instance represents a relationship whereby the investment represented by the parent object instance is an aggregation of the child object instances associated with the parent object instance.

67. The system of claim 58 wherein the investments are part of an enterprise portfolio management system.

68. The system of claim 58 wherein the investments include time-phased data.

69. The system of claim 68 wherein the time-phased data is stored in a manner that indicates a first designated time period in a virtual object instance and is stored in a manner that indicates a second designated time period in the object instances that are children of the virtual object instance that stores the time-phased data.

70. The system of claim 68 wherein a change to time-phased data of a virtual object instance is automatically reflected in changes to object instances that are children of the virtual object instance in which the change occurred.

71. The system of claim 58 wherein the object instances of the plurality that match the attribute specification is filtered based upon a security role associated with the request.

72. The system of claim 58 wherein the portfolio analysis component is further structured, when executed, to:
- receive an indication that the request to display data according to the attribute specification is to be applied to a different plurality of object instances of the hierarchy; and
- automatically modify the display of the object instances to include object instances from the different plurality that match the attribute specification.

73. The system of claim 58, each object instance having constituent attributes with associated values, further comprising:
- a charting tool that is structured, when executed, to:
  - associate a chart definition with the request to display data according to the attribute specification, the chart definition having an associated set of chart parameters; and
  - automatically determine values for the associated chart parameters based upon the constituent attributes of the object instances that match the attribute specification.

74. The system of claim 73 wherein the charting tool is further structured, when executed, to present a chart that corresponds to the chart definition, such that the values displayed by the chart are automatically determined from the values associated with the constituent attributes of the object instances that match the attribute specification.

75. The system of claim 73 wherein the charting tool is further structured, when executed, to:
- associate the chart definition with a request to display data from a different plurality of object instances according to a second attribute specification; and
- automatically re-determine the values for the associated chart parameters based upon the constituent attributes of the object instances from the different plurality that match the second attribute specification.

* * * * *